Figure 1:
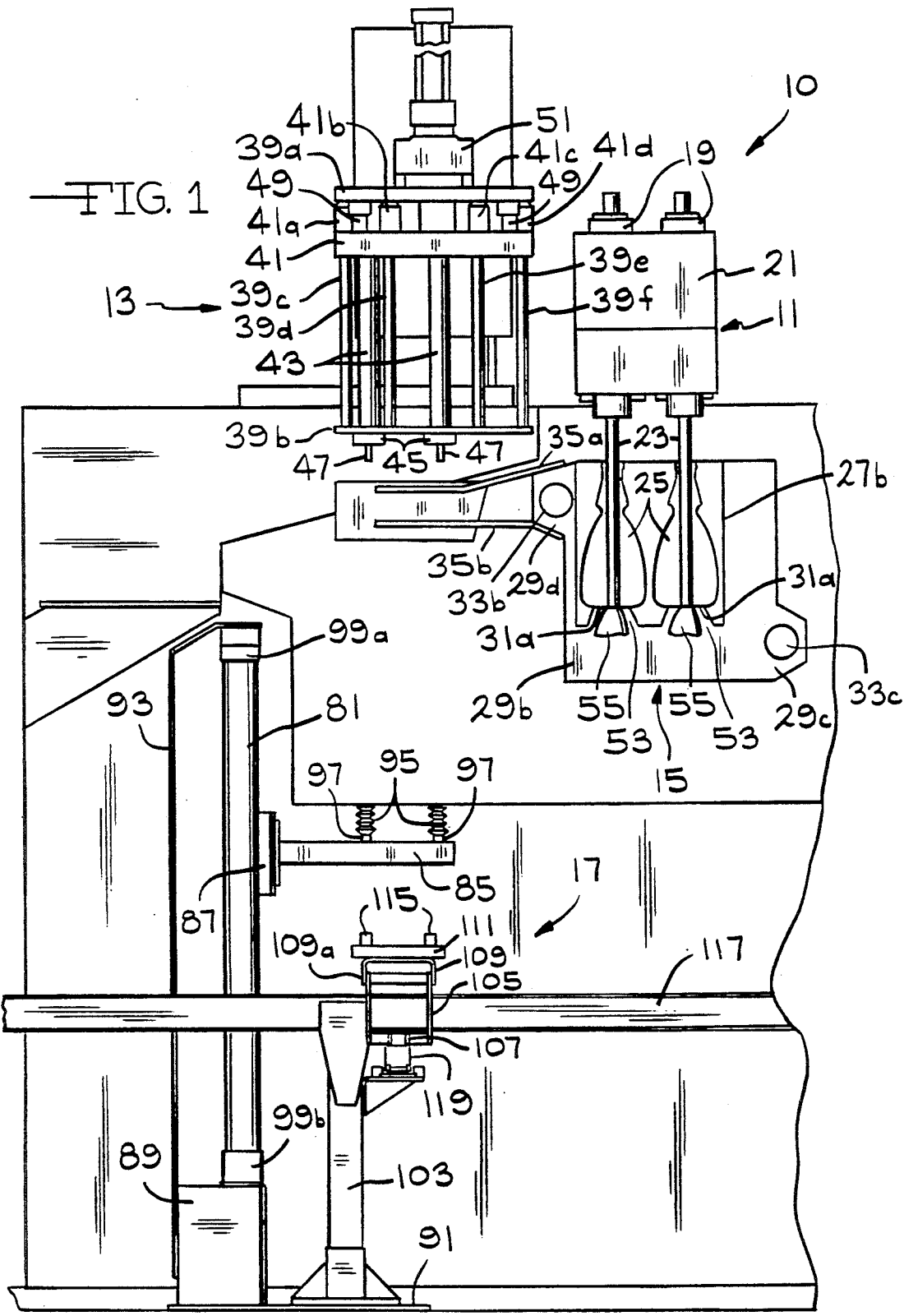

United States Patent [19]

Bruning

[11] Patent Number: 5,156,798
[45] Date of Patent: Oct. 20, 1992

[54] MOLDED BOTTLE REMOVAL APPARATUS AND METHOD

[75] Inventor: Karl H. Bruning, Okemos, Mich.

[73] Assignee: Bekum America Corporation

[21] Appl. No.: 706,771

[22] Filed: May 29, 1991

[51] Int. Cl.⁵ .................... B29C 49/04; B29C 49/50; B29C 49/56; B29C 49/70

[52] U.S. Cl. .................... 264/536; 264/335; 264/540; 264/542; 425/182; 425/527; 425/532; 425/534; 425/537; 425/538; 198/468.4; 414/627; 414/752

[58] Field of Search ........... 264/536, 542, 540, 335, 264/334; 425/527, 534, 537, 532, 436 RM, 437, 806, 538, 182; 414/752, 627; 198/468.4

[56] References Cited

U.S. PATENT DOCUMENTS

| | | | |
|---|---|---|---|
| 3,645,658 | 2/1972 | DeTroyer | 425/78 |
| 3,715,796 | 2/1973 | DeTroyer | 29/420 |
| 3,728,063 | 4/1973 | Langecker | 264/40.1 |
| 3,876,352 | 4/1975 | DeTroyer et al. | 425/78 |
| 4,035,463 | 7/1977 | Rosenkranz et al. | 264/335 |
| 4,424,185 | 1/1984 | DeSantis et al. | 264/334 |
| 4,551,193 | 11/1985 | Cano | 156/423 |
| 4,552,526 | 11/1985 | Hafele | 264/536 |
| 4,571,320 | 2/1986 | Walker | 264/40.1 |
| 4,614,018 | 9/1986 | Krall | 264/536 |
| 4,639,207 | 1/1987 | Slat et al. | 425/503 |
| 4,680,000 | 7/1987 | Nowicki et al. | 425/126 R |
| 4,752,206 | 6/1988 | Nowicki et al. | 425/537 |
| 4,769,205 | 9/1988 | Oles et al. | 264/509 |
| 4,834,643 | 5/1989 | Klinedinst et al. | 425/537 |
| 4,886,443 | 12/1989 | Klinedinst et al. | 425/537 |
| 4,968,240 | 11/1990 | Binacchi | 425/436 R |

*Primary Examiner*—Jan H. Silbaugh
*Assistant Examiner*—Catherine Timm

[57] ABSTRACT

An improved part removal assembly (17) particularly for a shuttle-type blow molding machine (10). The part removal assembly includes a plurality of suction cups (95) mounted on a vertically moveable piston (87) that travels along a vertically oriented rodless cylinder (81) and a plurality of suction cups (115) mounted on a horizontally moveable piston (107) that travels along a horizontally oriented rodless cylinder (83). A mold assembly (15) shuttles between an extruder head assembly (11) where a plurality of parisons of molten plastic are captured in mold cavities (25) in the mold assembly, and a blow station assembly (13) where the parisons are blown to form a molded workpiece (31). The mold assembly then opens which causes a flash removal assembly (57) to remove a waste flash portion (55) from a bottom portion (31a) of the workpieces. The bottom of the workpieces are then engaged by the vertically moveable suction cups which lower the workpieces to a position adjacent to a conveyor (117). The horizontally moveable suction cups then engage a side portion (31c) of the workpieces to move the workpieces to the conveyor. The mold assembly preferably provides for up to four cavities which are serviced by a corresponding number of vertically and horizontally moveable suction cups.

55 Claims, 9 Drawing Sheets

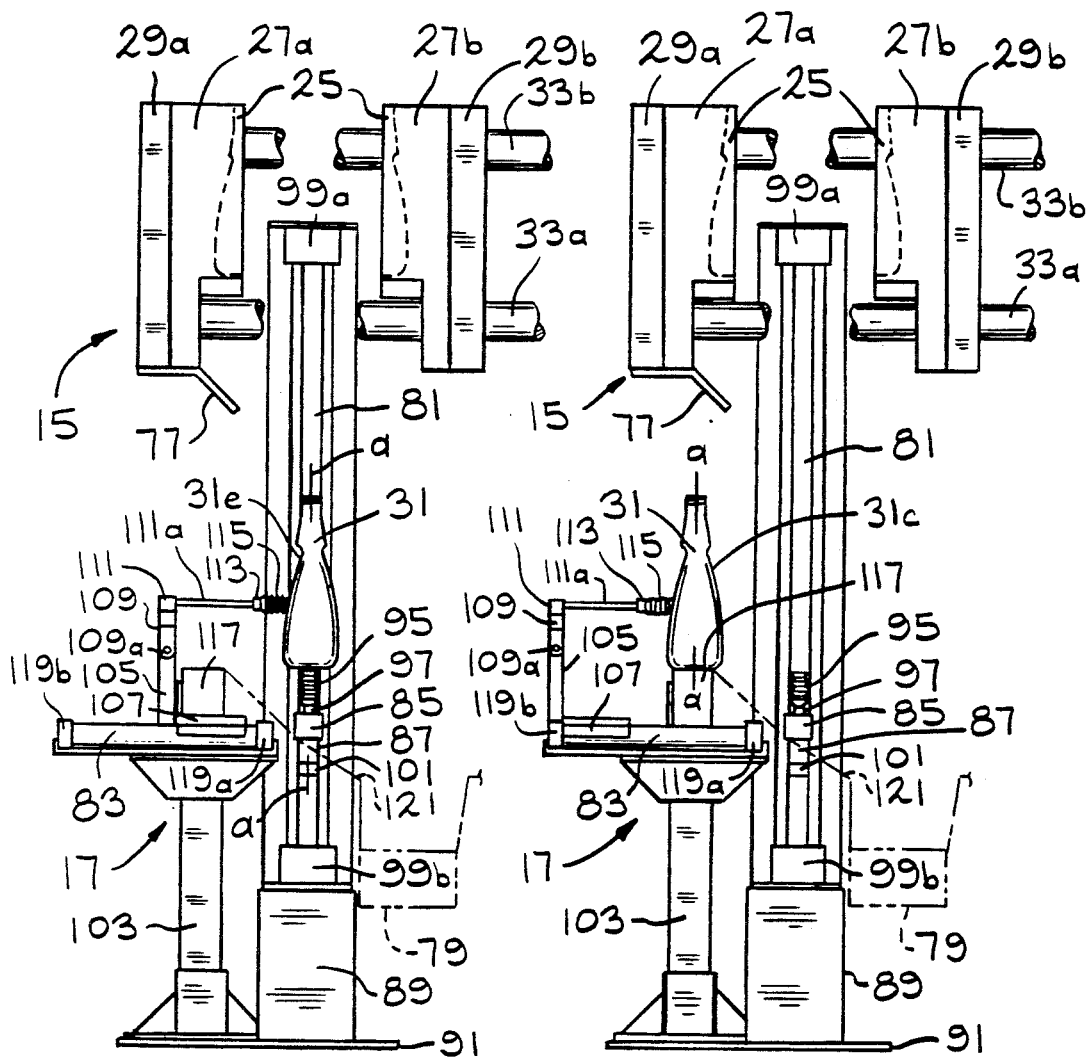

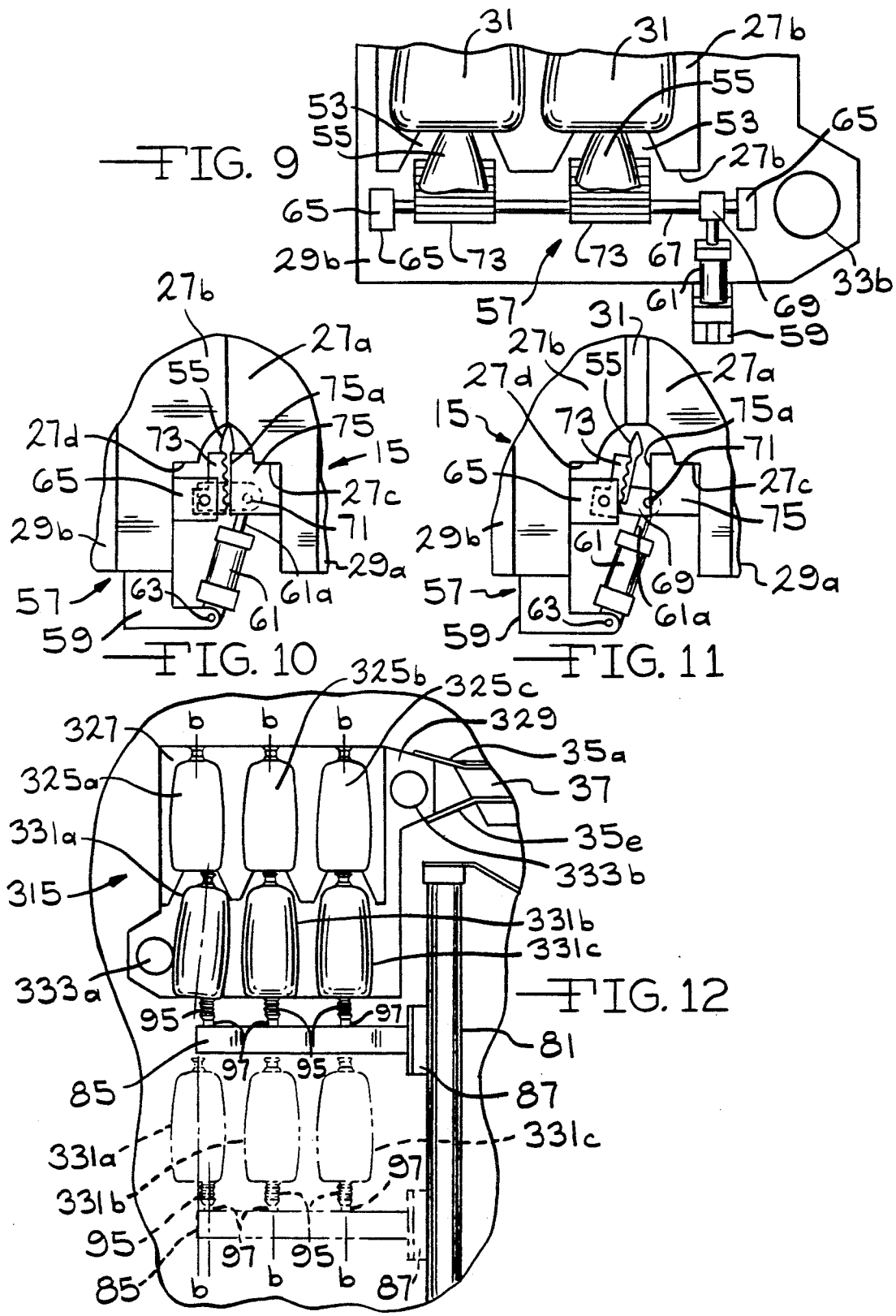

MOLDED BOTTLE REMOVAL APPARATUS AND METHOD

BACKGROUND OF THE INVENTION (1) Field of the Invention

The present invention relates to an apparatus and a process that is particularly useful for transferring a blow molded object from a molding machine to a collection means. In particular, the present invention relates to the removal of one or more finished or semi-finished blow molded objects, such as a bottle or a container, from one or more blowpins as the mold sections that form the molded object separate. This removal can be accomplished without delay or cycle time loss. Although this invention is particularly applicable to all types of shuttle-type blow molding machines, the present invention may also be used for removing parts from other types of blow molding machines where speed, accuracy and exact positioning of the object is desired or necessary.

(2) Prior Art

Shuttle-type blow molding machines of the prior art that produce hollow objects, such as bottles and containers from thermoplastic materials, have been in use for more than 30 years. These machines produce the hollow objects from a thermoplastic material in the shape of a parison which is captured between two moveable mold sections forming a mold as the mold sections close on the thermoplastic parison. The parison is then cut above the closed mold sections and the mold is immediately shuttled to the blow station where a blowpin is lowered into the mold cavity formed by the mold sections. Air or another suitable gas is then blown into the mold cavity, pushing the thermoplastic material against the walls of the mold. This causes the parison to conform to the shape of the mold cavity to form the hollow object. After an adjusted time for blowing and cooling the molded object, the mold opens and the blown object is left hanging from the blowpin. In the prior art devices, the blown object is then usually stripped off of the blowpin with stripper plates that knock the blown object off the blowpin. The blown object then falls onto a chute or a conveyor belt in an uncontrolled manner.

The prior art also uses two types of methods for removing the blown object from the blowpin in a controlled manner. The first method uses a mechanical gripping device. After the mold sections open and separate, the blown object is left hanging from the blowpin with a bottom flash or tail flash still attached at the seam where the mold sections joined together. A mechanical gripping device which was in position under the mold when the mold was closed, moves up and closes on the tail flash. The mechanical gripping device then moves down and places the blow molded object on the conveyor.

The first method of removing a blow molded object from a blowpin requires the molded object to have the tail or bottom flash attached to the blown object after the mold sections have separated. The bottom flash is removed in a later process. Also, the apparatus for this removal method is permanently attached to the blow molding machine.

The second method removes the blow molded objects from the blowpin, with or without a bottom flash or tail flash still attached to the molded object. In this method, once the mold has opened, the blowpin and the suspended molded object are pulled in an upward direction. This causes the blown object to contact a stop mechanism that results in the object being stripped off of the blowpin as discussed above. The blown object is then placed into a chute which lowers the object onto a conveyor system for transferring the blow molded object away from the molding machine. This removal apparatus is also permanently attached to the blow molding machine.

The prior art has described various types of devices which use a vacuum device to pick up a workpiece to be transferred. Illustrative of the prior art devices are U.S. Pat. Nos. 3,645,658 to DeTroyer; 3,715,796 to DeTroyer; 3,876,352 to DeTroyer et al; 4,424,185 to DeSantis et al; 4,551,193 to Cano; 4,571,320 to Walker; 4,639,207 to Slat et al; 4,680,000 to Nowicki et al; 4,752,206 to Nowicki et al; 4,769,205 to Oles et al; 4,834,643 to Klinedinst et al; 4,886,443 to Klinedinst et al; and 4,968,240 to Binacchi.

U.S. Pat. Nos. 3,645,658 and 3,715,796 to DeTroyer describes a fluid power system for a pickup and discharge mechanism for small manufactured articles or parts, such as made by a powder compacting press. After compacting in a die cavity, the finished parts upon ejection from the die cavities are picked up by a pickup head operatively connected to a suction source for displacement of the finished parts over a discharge port. The finished parts are individually discharged through the discharge port by means of a gentle blast of pressurized air. The suction force to pick up the finished parts is obtained from a flow of air through an appropriate venturi aspirator assembly.

U.S Pat. No. 3,876,352 to DeTroyer et al describes a collecting mechanism for collecting parts made by a powder compacting press. After the parts are ejected from die cavities, the parts are picked up by an aspirator assembly which gently lift the parts through a pick up head. The aspirator assembly is connected to a conduit for transferring the parts to a remotely located discharge station.

U.S. Pat. No. 4,424,185 to DeSantis et al describes a part pick-up head for transferring a part from an ejection station of an apparatus, such as a powder compacting apparatus, to a discharge station. The pick-up head is internally provided with a pair of reciprocating jaws, actuated by pressurized fluid such as compressed air, and arranged to clamp the part at the ejection station with enough pressure to hold the part securely for transfer to the discharge station. At the discharge station, the clamping jaws are spread apart by a return spring when fluid pressure is released. Auxiliary holding means in the form of suction ports above the part are disposed in the pick-up head. The pick-up head also incorporates suction orifices sweeping clean the surface of the die plate over which the pick-up head travels from the ejection station to the discharge station.

U.S. Pat. No. 4,551,193 to Cano describes an apparatus for applying reinforced bottom cups on blow molded plastic containers. The apparatus includes a transfer arm which grasps the outer peripheries of the molded hollow containers, such as bottles. The grasping action is performed by a suction means. The containers are then moved to a mounting station where previously adhesively coated bottom cups are pushed upwardly on to the bottom of the containers. The newly reinforced bottomed container are then discharged from the apparatus.

U.S. Pat. No. 4,571,320 to Walker describes a robot having an opposed set of suction cups used to load and unload precut pieces of sheet molding compound (SMC) from between an upper die and a lower die of a sheet molding press. While the press is molding a piece of SMC, the robot is positioned adjacent to the press, holding a raw piece of SMC with one of the sets of suction cups. On completing of the molding process, the press opens with the molded piece of SMC suspended in a predetermined intermediate position between the dies, adjacent to the upper die. The robot then enters the space between the molded piece and the lower die and if the molded piece is not stuck to the upper die, the robot secures onto the molded piece with the other set of suction cups. If the molded piece has stuck in the upper die, the robot attempts to retrieve the stuck piece of molded SMC. If this attempt is unsuccessful, the robot withdraws the raw piece of SMC from the press to permit removal of the stuck piece. If the molded part is not stuck on the upper die, the robot secures onto the molded piece with the other set of suction cups, unloads the raw piece of SMC onto the lower die and retracts the molded piece from the die.

U.S. Pat. No. 4,639,207 to Slat et al describes an in-mold label dispenser for a blow molding machine. A labeling cycle begins as a label dispensing head moves from a label magazine to the separated halves of a mold. Prior to this, the opposed arms of a label carrier for the label dispensing head engage labels from label magazines with suction cups. The arms then retract and the label dispensing head moves between the mold halves. The label carrier arms then extend to transfer the labels to an inside surface of the mold halves. The labels are held in this position by a vacuum system that communicates with the inside surface of the mold halves. Once the mold vacuum system engages the labels, the suction cups of the label carriers release from the labels and the carrier moves back into the retracted position. The dispensing head then moves back to the label dispenser as the mold halves close on an extrusion of hot plastic. When the extrusion is blown to conform to the mold, the hot plastic activates a heat sensitive adhesive on the labels to secure the labels to the mold.

U.S. Pat. No. 4,680,000 to Nowicki et al describes an apparatus for applying labels to both of the mold halves comprising a mold for a plastic blow molding machine where a plurality of sets of molds are mounted on a rotating wheel. The mold sections or halves are moved toward and away from one another to enclose a parison which is then blown to conform to the shape of the mold to form a plastic container such as a bottle. Labels are attached to the container by a label pickup mechanism comprised of a moveable linkage having a set of vacuum cups that remove a label from a magazine and move the label to a conveyor belt. Each mold half is serviced by a separate linkage system and conveyor belt with the labels held on the belts by a vacuum applied to the belts and, in turn, to any label on the belts. A label placement mechanism services each mold section and includes a reciprocating vacuum head which lifts a label from a belt and moves the label into the cavity of each of the mold sections. The label is then placed in the mold cavity by cutting off the vacuum to the reciprocating head and permitting a vacuum applied through vacuum holes in the mold section to hold the label in position. The mold then closes about the parison and when the parison is blown to conform to the shape of the mold, the labels become adhered to the blown plastic bottle.

U.S. Pat. No. 4,769,205 to Oles et al describes a shuttle-type blow molding machine and in-mold labeling apparatus for placing labels within open mold halves during movement of the mold halves from a blow station to an extrusion station. The machine includes a label transfer assembly having a pair of vacuum transfer heads that are moveable from a retracted position at label magazines, located away from the extrusion station to an extended position between the open mold halves as the mold halves move toward the extrusion station. The mold halves are mounted on a mold transfer carriage which moves between the blow mold and extrusion stations with the labels being transferred to the open mold halves before the mold assembly reaches the mold extrusion station. The labels are held against the recesses in the mold halves until the labels are picked up by vacuum manifolds communicating with the mold recesses. When this happens, the vacuum is removed from the transfer heads and the heads are withdrawn from the recesses. The mold transfer carriage is then moved to the extrusion station where a plastic parison is introduced between the mold halves. The vacuum transfer heads on the label transfer assembly move ahead of the mold transfer carriage so that the introduction of labels into the mold recesses does not slow down the molding process. In this way, the labels are automatically placed within the recesses of the mold halves during the normal cycle of operation of the blow molding machine.

The prior art has also described various types of apparatus that use a vacuum means for transferring a molded object from a mold to a collection device, such as a conveyor. When a molded object is formed between mold sections, a waste flash portion is formed along the seam between the mold sections at the top and the bottom of the object. This flash portion is usually removed from the molded object in a trimming operation after the molded object has been mechanically removed from the mold. Because of this, when the molded object is transferred to a discharge station such as a conveyor, the suction device must engage the molded object on a relatively smooth side, spaced from the flash portion on the bottom of the molded object.

U.S. Pat. No. 4,968,240 to Binacchi describes a device for positioning products extracted from a mold onto a conveyor belt. The device has a main body which supports a second set of suckers that engage the products extracted from a mold by a first set of suckers. An actuation device acts on the second suckers to move them from a first product receiving position to a second position where the product is arranged facing a conveyor belt having product containment pockets.

U.S. Pat. No. 4,752,206 to Nowicki et al describes a take-out assembly for blow molding machines having a continuously rotating turntable, rotating about a horizontal axis. The take-out assembly includes a turntable with a plurality of extending pick-up units having suction cup type engaging pads at their ends. Rotation of the take-out assembly turntable is coordinated with the blow molder turntable such that a suction cup pick-up unit is positioned to engage a side of a workpiece at the desired work station. The pick-up units are radially movable to extend and retract to provide clearance during rotation and to properly engage the workpiece at the discharge station. Workpieces removed from the blow molder turntable are transported by the pick-up assembly into registry with an associated material handling device such as an endless belt type conveyor. This apparatus is quite complicated and expensive to construct and is not adapted to shuttle-type blow molding machines.

U.S. Pat. Nos. 4,834,643 and 4,886,443 to Klinedinst et al both describe a blow molded bottle extraction, trimming and discharge apparatuses that include a rotary turntable and a plurality of bottle transfer units spaced around the turntable. The bottles are molded in an inverted position with the necks of the bottles at the bottom of the mold cavities and the bottom of the bottles at the top of the mold cavities. Each transfer unit has indexing suction cups for picking up the bottles which have been extracted from between mold halves by engaging the tail flash with gripping fingers and lifting the bottles upwardly, a distance above the mold halves. The tail flash is then released by the gripping fingers, the bottles are inverted and moved to a trimming station for removing the neck and tail flash, after which the bottles are moved to a discharge stations. At the discharge station, the bottles are transferred from the indexing vacuum cups to a second set of vacuum cups that deposit the bottles on a conveyor for a subsequent operation. Because the molded bottles are initially extracted from the mold halves by the gripping fingers, even deformed bottles are removed from the mold halves. In this manner, deformed bottles are removed from the mold halves and prevented from ruining subsequently formed bottles.

The problem addressed by the present invention and not by the prior art, is to produce, extract and transfer a finished bottle with the flash removed, from the mold of a blow molding machine. None of the prior art blow molding apparatus have been able to accomplish this result.

OBJECTS

It is therefore an object of the present invention to provide an apparatus for producing one or more finished blow molded objects and removing the objects from their respective blow needles or blow pin without the bottom or tail flash attached to the molded objects. Further, it is an object of the present invention to provide a method for removing a blow molded object from a molding machine without causing a delay in the molding cycle as the molded object is being removed from its blow needle. Further, it is an object of the present invention to provide a portable apparatus that is easily moved from one molding machine to another molding machine and which can be used with existing molding apparatus. Further still, it is an object of the present invention to provide an apparatus which is capable of engaging a plurality of blow molded objects and removing the objects from their respective blow needles for placing the objects on a collection means such as an endless conveyor. Finally, it is an object of the present invention to provide an apparatus which transfers a blow molded object from a blow needle to a collection means such as a conveyor, after the mold sections of a mold assembly have separated from the molded object. These and other objects will become increasingly apparent by reference to the following

IN THE DRAWINGS

FIG. 1 is a partial front view of a blow molding machine 10 including an extruder head assembly 11, a blow station assembly 13 and mold assembly 15 with two parisons 23 being captured in a mold cavity 25 of a mold section 27b and a part removal assembly 17.

Figure 2:
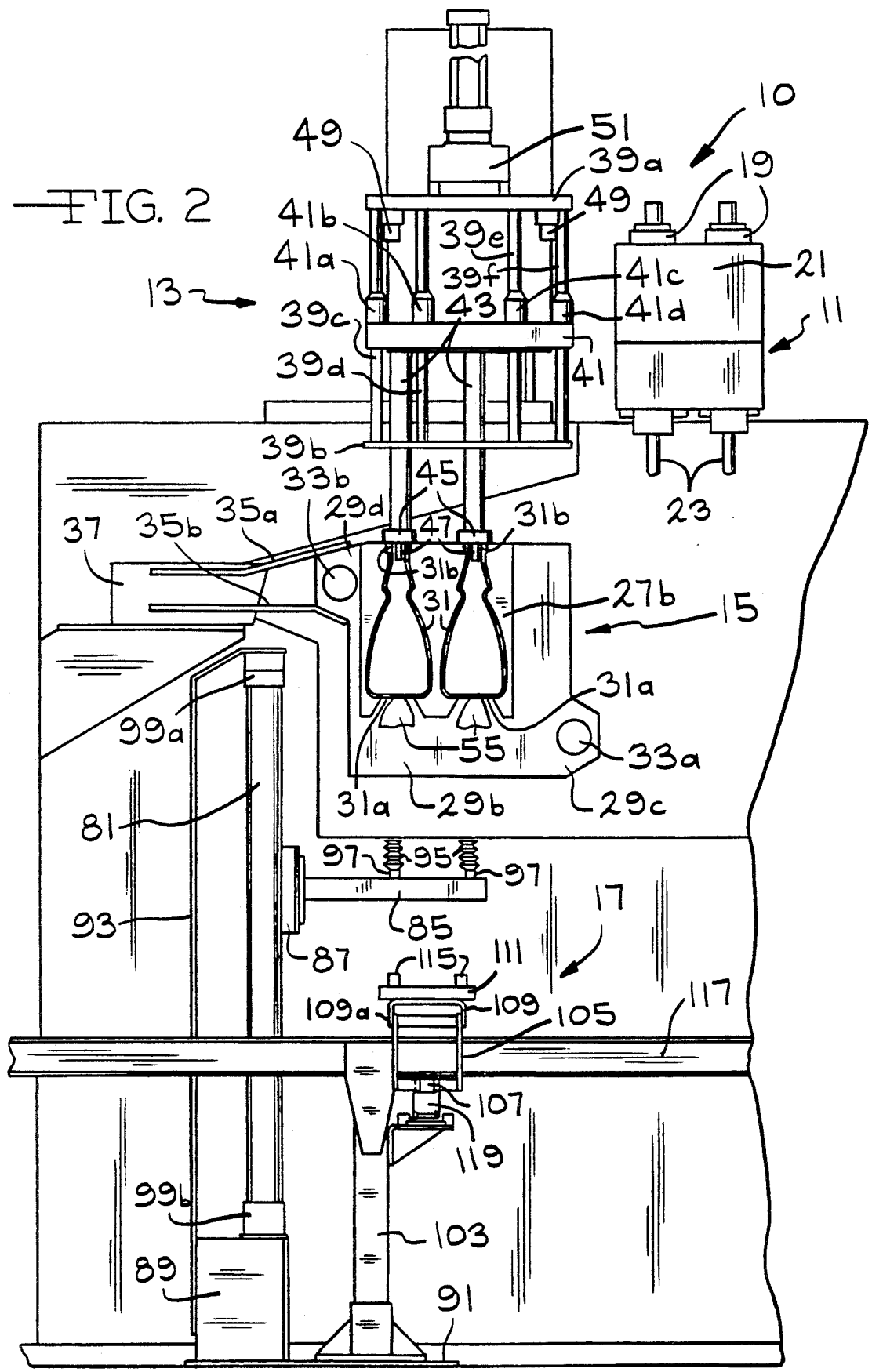

FIG. 2 is a partial front view of the machine 10 of FIG. 1 showing the mold section 27b moved to the blow station assembly 13 and with a blow needle 47 inserted into the mold cavities 25 to form molded workpieces 31.

Figure 3:
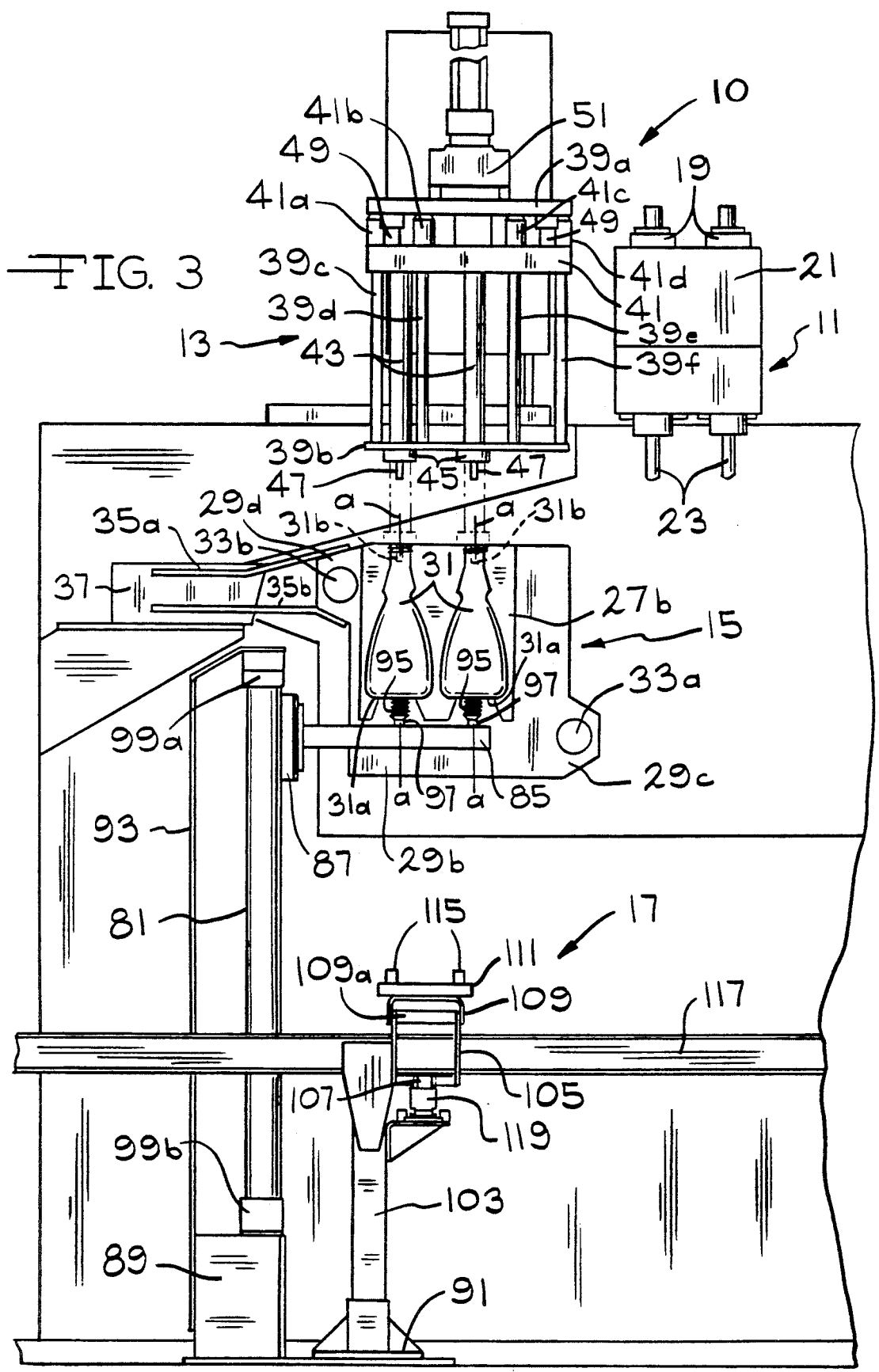

FIG. 3 is a partial view of the machine 10 of FIG. 1 showing the blow needles 47 removed from the mold cavities 25 with a pair of vertically moveable suction cups 95 engaged on a bottom 31a of the workpieces 31.

Figure 4:
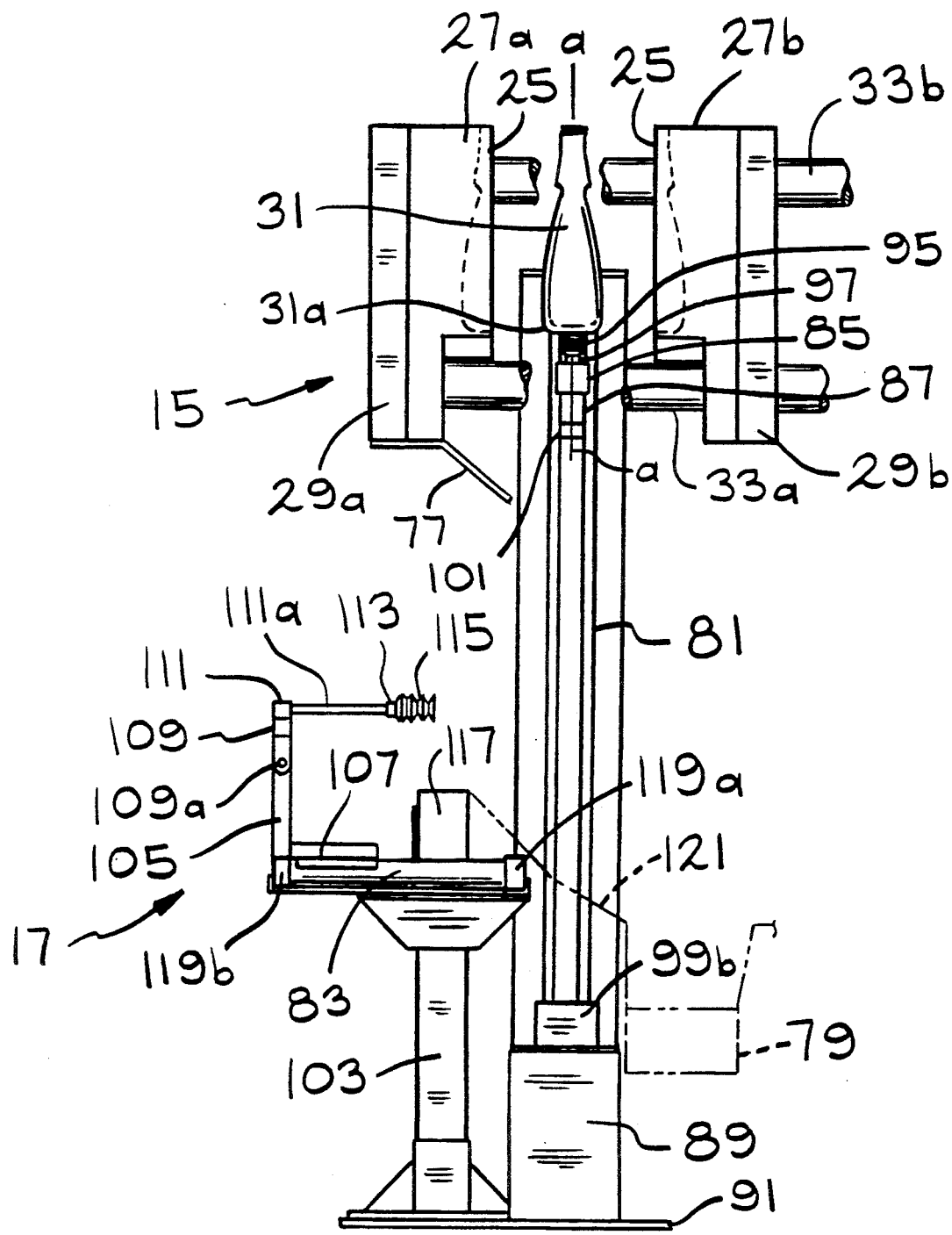

FIG. 4 is a side view of the mold assembly 15 in an open position and with the suction cups 95 of the part removal assembly 17 engaged on the bottom 31a of the workpiece 31.

Figures 5, 6:
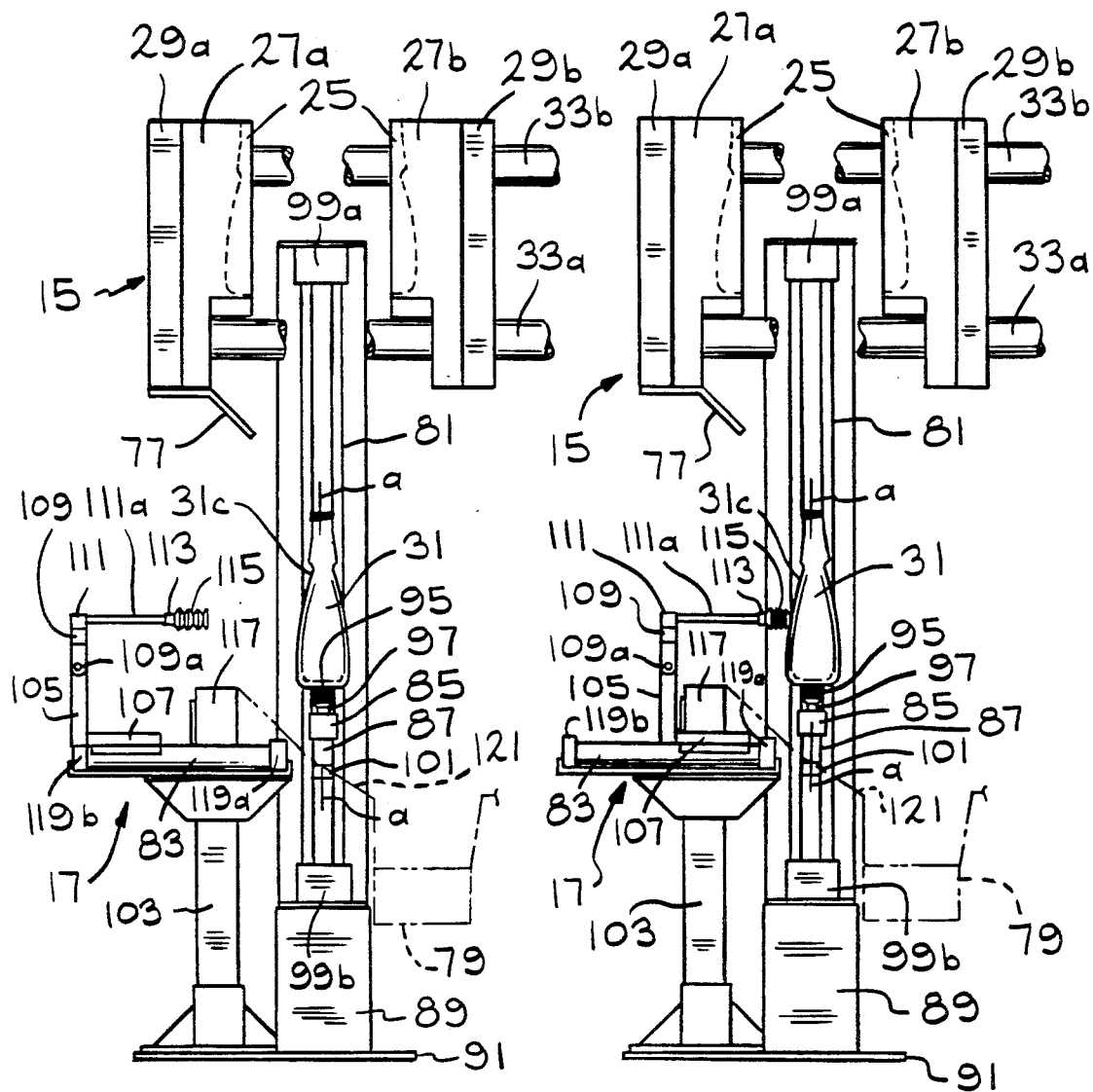

FIG. 5 is a side view of the workpiece 31 and the suction cup 95 of the part removal assembly 17 in a lowered position, adjacent to a conveyor 117.

FIG. 6 is a side view with a horizontally moveable suction cup 115 of the part removal assembly 17 engaged on a side 31c of the workpiece 31.

FIG. 7 is a side view showing the vertically moveable suction cup 95 of the part removal assembly 17 lowered away from the workpiece 31 and with the suction cup 115 engaged on the side 31c of the workpiece 31.

FIG. 8 is a side view with the horizontally moveable suction cup 115 in a retracted position and the workpiece 31 resting on a conveyor 117.

FIG. 9 is a partial front view of the flash removal device 57 with grooved plates 73 and cylinder 61.

FIG. 10 is a partial side view with the mold assembly 15 in a closed position and a waste flash portion 55 held between the grooved plate 73 and L-shaped block member 75.

FIG. 11 is a partial side view of the mold assembly 15 in a partially opened position and the waste flash portion 55 removed from the workpiece 31.

FIG. 12 is a partial front view of a mold assembly 315 with a left most workpiece 331a engaged by a suction cup 95, offset from a longitudinal axis a—a of the workpiece 331a.

Figure 13:
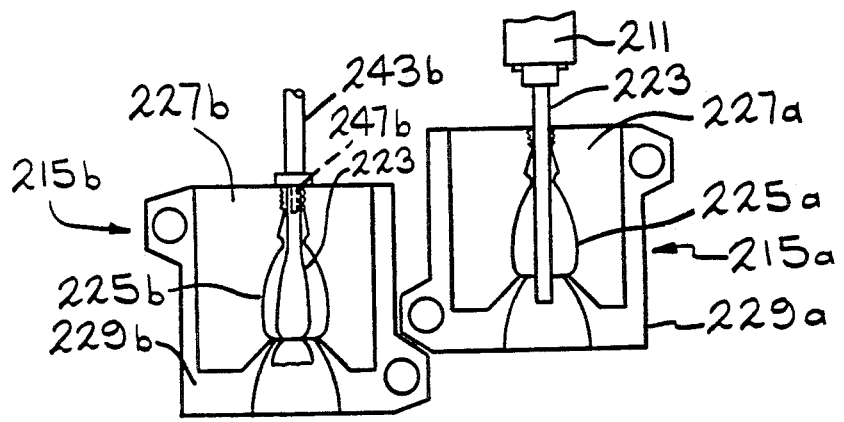

FIG. 13 is a schematic view of a right mold platen 215a at an extruder head assembly 211 and a left mold platen 215b at a left blow cylinder 243b.

Figure 14:
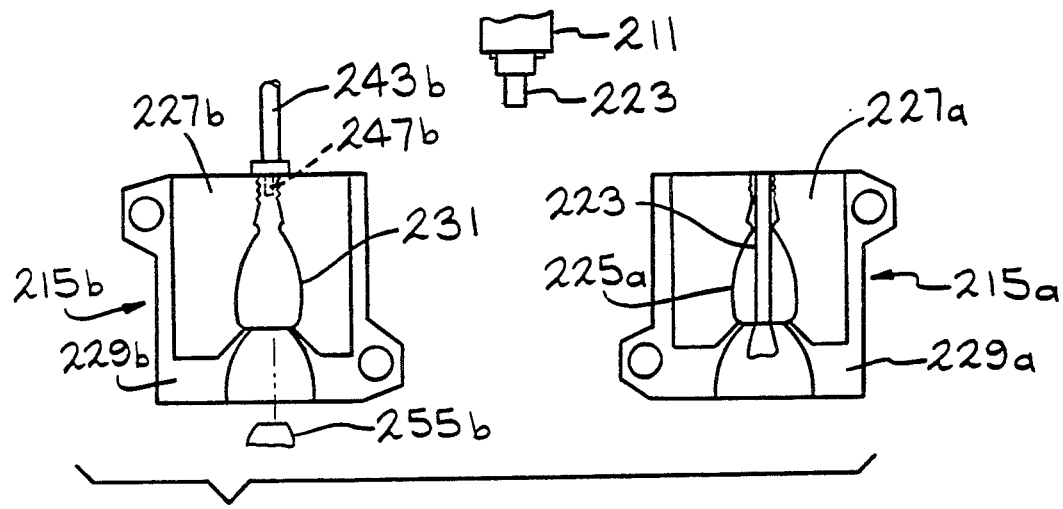

FIG. 14 is a schematic view of the right platen 215a moved away from the extruder head assembly 211 and a waste flash portion 255b falling from a left workpiece 231.

Figure 15:
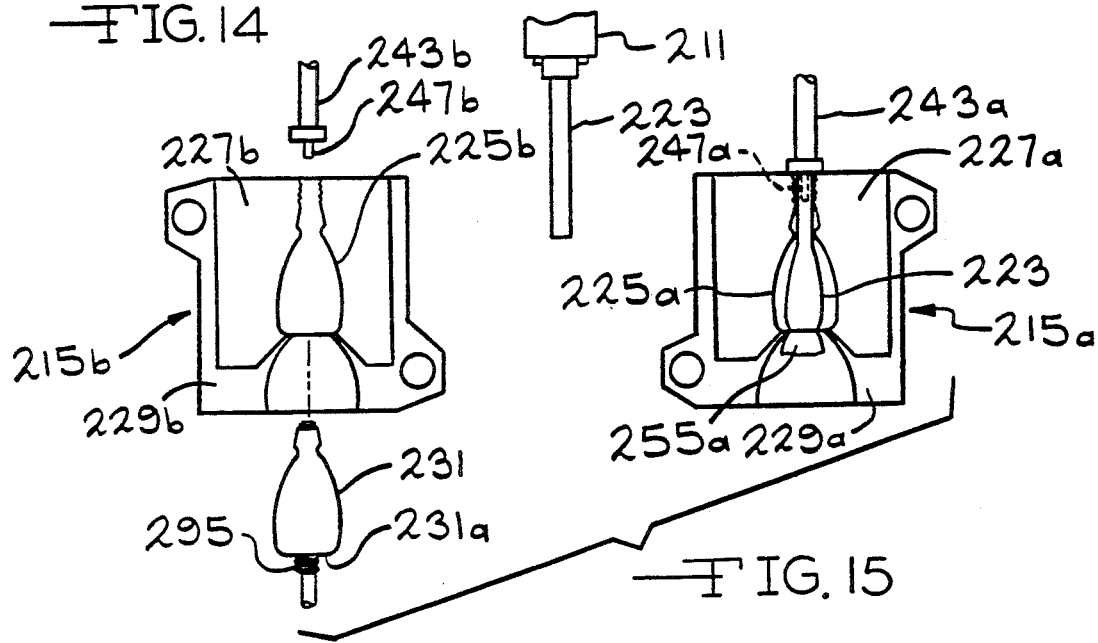

FIG. 15 is a schematic view of the right platen 215a at a right blow cylinder 243a and a suction cup 95 removing the workpiece 231 from the left mold assembly 215a.

Figure 16:
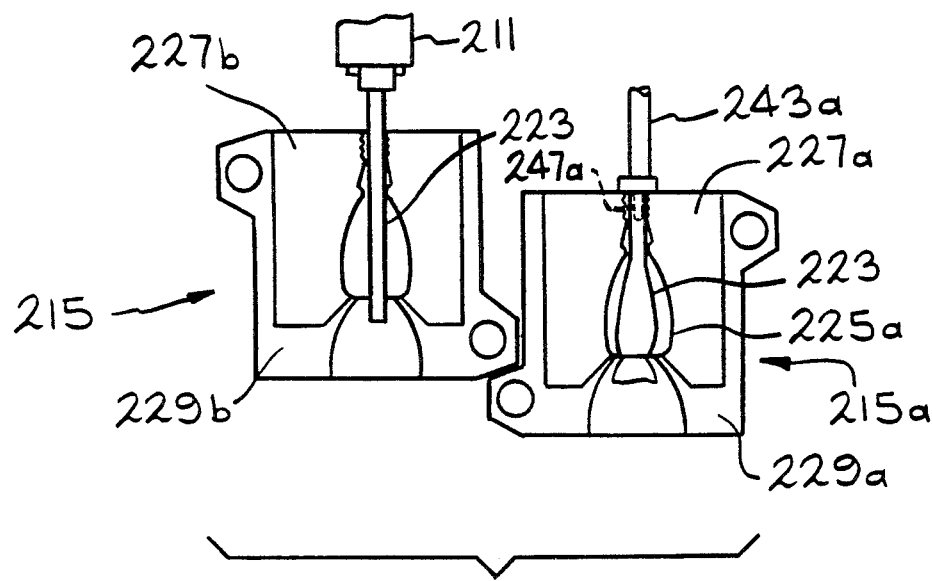

FIG. 16 is a schematic view of the left mold assembly 215b moved to the extruder head assembly 211 to capture a parison 223.

Figure 17:
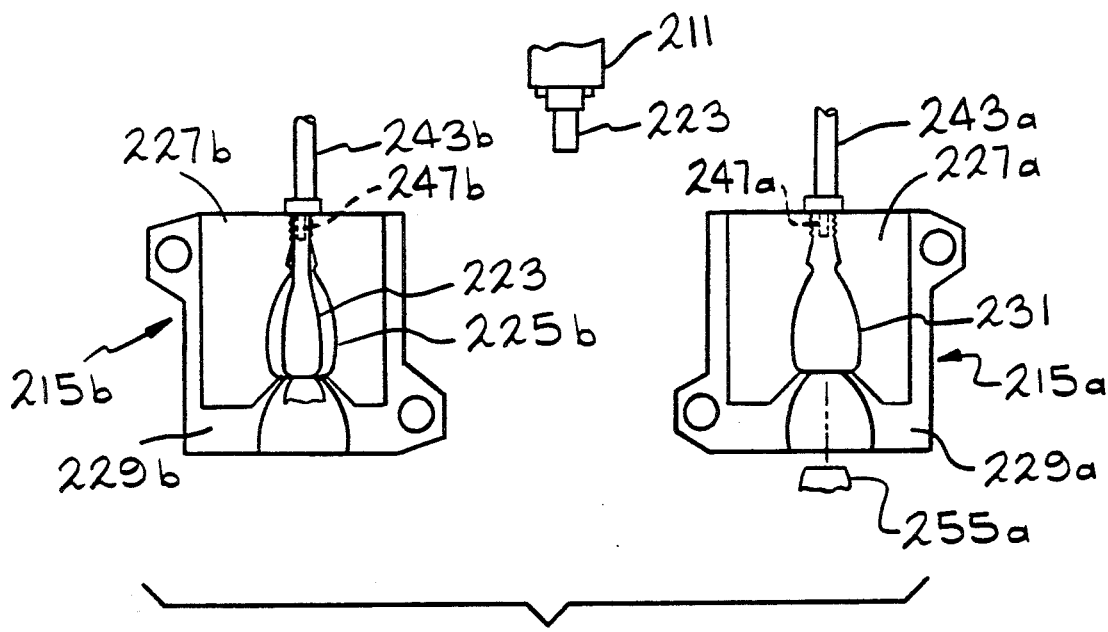

FIG. 17 is a schematic view of the left mold assembly 215b moved to the left blow cylinder 243b and a waste flash portion 255a falling from a right molded workpiece 231.

GENERAL DESCRIPTION

The present invention relates to an apparatus for transferring a blow molded object from a molding means to a collection means after a plastic parison has been captured and molded between mold sections of the molding means which mold sections are relatively moveable between an open and a closed position, wherein in the closed position, the mold sections define a cavity that encloses the parison and the parison is then blown to conform to the cavity to form the molded object and after the molded object has been formed, the mold sections move into the open position with a waste flash portion falling away from a lowermost portion of the blow molded object and with the blow molded object supported by a blowpin for blowing the parison to conform to the cavity, which comprises: an upwardly moveable suction means having a vacuum means that engages the blow molded object at the lowermost portion, wherein the blow molded object is then removed from the blowpin as the moveable suction means moves away from the mold sections of the molding means to a station adjacent to the collection means where the vacuum means is disconnected from the moveable suction means to cause the blow molded object to disengage from the moveable suction means and move onto the collection means.

Further, the present invention relates to an apparatus for transferring a blow molded object from a molding means to a collection means after a plastic parison has been captured and molded between mold sections of the molding means which mold sections are relatively moveable between an open and a closed position, wherein in the closed position, the mold sections define a cavity that encloses the parison and the parison is then blown to conform to the cavity to form the molded object and after the molded object has been formed, the mold sections move into the open position with a waste flash plaque portion falling away from a lowermost portion of the blow molded object and with the blow molded object supported by a blow pin for blowing the parison to conform to the cavity, which comprises: a first upwardly moveable suction means having a first vacuum means that engages the blow molded object at a lowermost portion and removes the blow molded object from the blowpin, to transfer the blow molded object to a first station adjacent to the collection means; and a second sidewardly moveable suction means having a second vacuum means that engages the blow molded object after the first moveable suction means has moved the blow molded object to the first station and wherein after the second vacuum means engages the blow molded object, the first vacuum means releases to enable the second moveable suction means to transfer the blow molded object to a second station on the collection means.

Further, the present invention relates to an apparatus for transferring a blow molded container from a molding means for the container to a collection means after a plastic parison has been captured and molded between mold sections of the molding means which mold sections are relatively moveable between an open and a closed position, wherein in the closed position, the mold sections define a cavity that encloses the parison and the parison is blown to conform to the cavity by a blowpin in communication with the cavity and after the molded container has been formed, the mold sections move into the open position with a waste flash portion falling away from a lowermost portion of the blow molded object and with the blow molded container supported by the blowpin, which comprises: a first transferring means moveable between a first and a second station, the first transferring means mounting a first vacuum means for engaging the molded container, wherein the first transferring means moves to the first station to enable the first vacuum means to engage the molded container at the lowermost position as the mold sections are moved into the open position and wherein the first transferring means then removes the molded container from the blowpin and moves to the second station with the first vacuum means holding the molded container; and a second transferring means, moveable between the second and a third stations, the second transferring means mounting a second vacuum means for engaging the molded container, wherein the second transferring means moves to the second station to enable the second vacuum means to engage the molded container once the first transferring means has moved the molded container to the second station with the second vacuum means engaging the molded container before the first vacuum means has released from the container, to move the molded container to the third station wherein the second vacuum means releases the molded container onto the collection means.

Still further, the present invention relates to a method for transferring a blow molded object from a molding means to a collection means after a plastic parison has been captured and molded between mold sections of the molding means which mold sections are relatively moveable between an open and a closed position, wherein in the closed position, the mold sections define a cavity that encloses the parison and the parison is then blown to conform to the cavity to form the blow molded object and after the molded object has been formed, the mold sections move into the open position with a waste flash portion falling away from a lowermost portion of the blow molded object and with the blow molded object supported by a blowpin for blowing the parison to conform to the cavity, which comprises: introducing a plastic parison into the cavity formed by the mold sections of the molding means and blowing the plastic parison to the confines of the cavity with the blowpin to form the blow molded object; and transferring the blow molded object to the collection means by a moveable suction means having a vacuum means which engages the blow molded object, wherein the molded object is removed from the blowpin as the moveable suction means moves away from the mold sections of the molding means to a station adjacent to the collection means where the vacuum means is disconnected from the moveable suction means to cause the blow molded object to disengage from the moveable suction means and move to the collection means.

Furthermore, the present invention relates to a method for transferring a blow molded object from a molding means to a collection means after a plastic parison has been captured and molded between mold sections of the molding means which mold sections are relatively moveable between an open and a closed position, wherein in the closed position, the mold sections define a cavity that encloses the parison and the parison is then blown to conform to the cavity to form the molded object and after the molded object has been formed, the mold sections move into the open position with a waste flash portion falling away from a lowermost portion of the blow molded object and with the blow molded object supported by a blowpin for blowing the parison to conform to the cavity, which comprises: introducing a plastic parison into the cavity formed by the mold sections of the molding means and blowing the plastic parison to the confines of the cavity with the blowpin to form the molded object; and transferring the blow molded object to the collection means by a first moveable suction means which engages the blow molded object at the lowermost portion and removes the blow molded object from the blowpin and by a second moveable suction means which engages the blow molded object after the first moveable suction means has moved the blow molded object to the first station so that the second suction means transfers the blow molded object to the second station on the collection means.

Finally, the present invention relates to a method for transferring a blow molded container from a molding means for the container to a collection means after a plastic parison has been captured and molded between mold sections of the molding means which mold sections are relatively moveable between an open and a closed position, wherein in the closed position, the mold sections define a cavity that encloses the parison and the parison is blown to conform to the cavity by a blow pin in communication with the cavity and after the molded container has been formed, the mold sections move into the open position with a waste flash portion falling away from a lowermost portion of the blow molded object and with the molded container supported by the blowpin, which comprises: introducing a plastic parison into the cavity formed by the molded sections of the molding means and blowing the plastic parison to the confines of the cavity with the blowpin to form the molded container; and transferring the molded container to the collection means by a first and a second transferring means, which first transferring means moves to the first station to enable the first vacuum means to engage the molded container at the lowermost portion as the mold sections are moved into the open positions, wherein the first transferring means then moves the molded container from the blowpin to the second station with the first vacuum means holding the molded container, and wherein the second transferring means, which moves between the second and the third stations, moves to the second station with the second vacuum means engaging the molded container once the first transferring means has moved the molded container to the second station, but before the first vacuum means has released from the molded container, to move the molded container to the third station wherein the second vacuum means releases the molded container onto the collection means.

The suction means are conventional suction cups that are preferably made of an elastomeric material such as a soft, flexible silicone elastomer material. This ensures that the suction cups are able to easily conform to the shape of the blow molded object or workpiece to hold the workpiece in a vacuum engagement. The suction cups preferably have a circular cross-section perpendicular to the longitudinal axis of the cups and are mounted on a moveable arm that travels on a piston in a rodless cylinder. The width of the arm is between about 1 and 2 inches (2.54 and 5.1 cm), the length of the arm is between 10 and 20 inches (25.4 to 50.8 cm), and the diameter of the cups preferably ranges from about 1 to 3 inches (2.54 to 7.6 cm). That way, once the mold sections have started to move into the open position at a distance of about 3 to 10 inches (7.6 to 25.4 cm), there is enough clearance for a suction cup to move up through the opening between the mold sections to engage a bottom portion of a workpiece. Before the suction cups engage the workpiece, however, a waste flash portion is removed from the bottom portion of the workpiece. This is done immediately upon the first movement of the mold sections towards the open position.

The mold sections are further provided with channels for pumping a cooling fluid through the mold sections. The cooling fluid acts to cool the blow molded object so that the molded object is not deformed by engagement with the suction devices. The molded object must be cooled to a temperature of between about 100° and 140° F. (37.8° to 60.0° C. depending on the type of plastic being molded.

The suction cups comprise a part removal assembly that is used with a shuttle-type blow molding machine as is hereinafter described. The part removal assembly can also be used with single mold blow molding machines, blow molding machines having a continuously rotating turntable and other type of blow molding machines.

SPECIFIC DESCRIPTION

A blow molding machine with an improved take-out assembly according to the present invention is shown in partial view in FIGS. 1 to 8, and is generally designated by reference number 10. Blow molding machine 10 is of the shuttle-type and generally comprises extruder head assembly 11, blow station assembly 13 and mold assembly 15 with a part removal assembly 17 of the present invention connected to the molding machine 10.

As shown in FIGS. 1 to 3, the extruder head assembly 11 is comprised of one or more side-by-side metering heads 19 mounted in extruder heads 21. The extruder heads 21 feeds a molten moldable material, preferably a plastic material, through to conform a parison 23. The extruder heads 21 operate in a coordinated manner so that once a parison 23 of a sufficient length has been extruded from each of the extruder heads 21, the parison 23 is captured in a mold cavity 25 formed between left and right mold halves or sections 27a and 27b (FIGS. 4 to 8). The mold sections 27a and 27b are removably secured to respective mold platens 29a and 29b to form the mold assembly 15 and each mold section 27a and 27b provides an indentation that comprises half of the mold cavity 25. The platens 29a and 29b serve to removably mount the mold sections 27a and 27b so that the mold sections 27a and 27b can be removed and changed, depending on the desired shape of a molded workpiece 31 to be produced. The workpiece 31 shown in Figures is of a conventional bottle such as is used to hold a mouth wash composition.

It should be noted that the left and the right mold sections 27a and 27b and their respective platens 29a and 29b in FIGS. 4 to 8 correspond to the front and back mold sections and platens in FIGS. 1 to 3. However, for clarity in describing the present invention, the front or left mold section 27a and the front or left platen 29a has been removed in FIGS. 1 to 3. Also, the mold assembly 15 shown in FIGS. 1 to 3 and 9 is shown as providing for two cavities 25 for forming two molded workpieces 31 although, the mold sections 27a and 27b are capable of being provided with one to four mold cavities 25.

As shown in FIG. 1, the mold platens 29a and 29b have a generally square shape. The back mold platen 29b is completed by guide shaft extensions 29c and 29d provided diagonally opposite each other on the platen 29b. The front mold platen 29a has similar extensions (not shown) which mirror the extension 29c and 29d on platen 29b. The mold platens 29a and 29b are connected by hydraulic guide cylinders 33a and 33b mounted through opposed platen extensions. The mold platens 29a and 29b slide back and forth on the hydraulic guide cylinders 33a and 33b as the platens 29a and 29b cycle between an open position awaiting a parison 23 and a closed position as the parison 23 is being blow molded to form a molded workpiece 31, and back to the open position while the workpiece 31 is removed from the mold cavity 25 by the part removal assembly 17. The back mold platen 29b is completed by an upper and a lower brace 35a and 35b which provides for mounting a catch trough 37.

The blow station assembly 13 is mounted on the blow molding machine 10, adjacent to the extruder head assembly 11. In a conventional, shuttle-type molding machine as shown in schematic in FIGS. 13 to 17, the extruder head assembly 11 is at an intermediate position between two blow station assemblies 13. The blow station assembly 13 includes an upper beam member 39a and a lower beam member 39b with support columns 39c, 39d, 39e and 39f extending between the beam members 39a and 39b. A blowpin support beam 41 is slideably mounted on the support columns 39c, 39d, 39e and 39f by hydraulic cylinders 41a, 41b, 41c and 41d, respectively. A plurality of blowpin cylinders 43 are mounted on the support beam 41 which slides on the columns 39c, 39d, 39e and 39f as the mold assembly 15 cycles between the extruder head assembly 11 and the blow station assembly 13. Each blowpin cylinder 43 provides for mounting a blowpin head 45 and a blowpin or needle 47 mounted at a lower end of the blowpin cylinder 43. As shown in FIGS. 1 to 3, shock absorbers 49 are mounted underneath the upper beam member 39a, adjacent to the support columns 39c and 39, and help to absorb the shock created when the support beam 41 moves into an upward position, towards the upper beam member 39a. Mounted on top of the upper beam member 39a is a hydraulic cylinder assembly 51 that serves to raise and lower the blowpin support beam 41, the blowpin cylinders 43 and the blow needles 47. The blow needles 47 are in airflow communication with a compressed air supply (not shown) through the cylinders 43 for blowing parisons 23 to form blow molded workpieces 31.

The mold assembly 15 is provided with a flash cavity 53 beneath each mold cavity 25. As shown in cross-section in FIGS. 10 and 11, each flash cavity 53 has an arcuate shape that extends from the bottom of the mold cavity 25 to a bottom wall 27c and 27d of the respective mold sections 27a and 27b. The flash cavities 53 provide a space for a bottom portion of the parison 23. When the parison 23 is captured in the mold cavity 25 between the mold sections 27a and 27b, a portion of the parison 23 extends through the cavity 25 to insure that the cavity 25 has a sufficient amount of parison 23 to form a complete workpiece 31. During the molding process, the portion of the parison 23 that extends below the cavity 25 is called a waste flash portion 55. That way, when a workpiece 31 is formed, the waste flash portion 55 is formed in the flash cavity 53.

As shown in FIGS. 9, 10 and 11, a bottom portion of the mold platens 29a and 29b provides for mounting a flash removal device 57 beneath the mold sections 27a and 27b. The flash removal device 57 includes an L-shaped bracket 59 mounted on a bottom part of the left mold platen 29b. Bracket 59 provides for pivotally mounting a pneumatic cylinder 61 at an end of the bracket 59 by a pivot pin 63. The cylinder 61 can also be hydraulic, although a pneumatic cylinder is preferred. The pneumatic cylinder 61 eliminates the possibility of getting hydraulic fluid on the mold workpiece 31.

Spaced apart mounting brackets 65 are mounted on the left mold platen 29b and provide for mounting a rod member 67. Rod member 67 is rigidly connected to a connecting arm 69. The connecting arm 69 in turn is pivotally connected to a shaft 61a of the cylinder 61 by a connecting pin 71. The rod member 67 provides for rigidly mounting a grooved plate 73 on the left platen 29b beneath each of the flash cavities 53. Right mold platen 29a has an L-shaped block member 75 mounted beneath the right portion of each of the flash cavities 53. There is a corresponding number of grooved plates 73 and block members 75 for each mold cavity 53. The block members 75 have a face side 75a that is aligned along the seam formed by the mold sections 27a and 27b when the platens 29a and 29b are in the closed position (FIG. 10).

As shown in FIG. 10, when the mold assembly 15 is in the closed position, the flash portion 55 is pinched in the space between where the lower edges of the mold sections 27a and 27b meet, beneath the bottom of the mold cavity 25. The flash portion 55 is also compressed between the grooved plate 73 and the block member 75. The grooved plate 73 secures onto the flash portion 55 so that the flash portion 55 does not slip between the plate 73 and block 75 when the platens 29a and 29b move into the open position (FIG. 11). In this manner, as the platens 29a and 29b first start to separate, the pneumatic cylinder 61 partially contracts. This causes the shaft 61a of the cylinder 61 to move downward which in turn moves the connecting arm 69 downward. The downward movement of the connecting arm 69 rotates the rod member 67 so that the grooved plate 73 rotate as shown in FIG. 11 to cant the flash 55, causing it to break from the molded workpiece 31 at the seam where the parison 23 is pinched by the lower edges of the mold sections 27a and 27b. The flash 55 then falls away from the molded workpiece 31 and hits a deflector 77 where it deflects into a flash conveyor 79 (shown in FIGS. 4 to 8). The waste flash portion 55 must be removed from the bottom of the molded workpiece 31 before the part removal assembly 17 is able to engage a bottom portion 31a of the workpiece 31 in a vacuum engagement.

As shown in FIGS. 1 to 8, the part removal assembly 17 is comprised of a vertical rodless cylinder 81 and a horizontal rodless cylinder 83. The rodless cylinders 81 and 83 are similar to those manufactured by Origa Corporation, Elmhurst, Illinois. The vertical rodless cylinder 81 includes a hollow arm 85 mounted on a piston 87 that travels along the rodless cylinder 81. The rodless cylinder 81 is mounted on a control box 89 which is mounted on a horizontal mounting plate 91 and is connected to a pressurized air supply (not shown) for actuating the piston 87. The control box 89 coordinates the movement of the part removal assembly 17 with the blow molding machine 10. The rodless cylinder 81 is further supported on the mounting plate 91 by a brace 93. The mounting plate 91 is provided with leveling screws (not shown) for leveling the part removal assembly 17.

Arm 85 mounts a corresponding number of suction cups 95 with the number of mold cavities 25. The suction cups 95 are rigidly connected to the arm 85 by quick disconnect couplings 97 and serve to remove the molded workpieces 31 from the cavities 25. The quick disconnect couplings 97 enable the suction cups 95 to be easily removed from the arm 85 and replaced should the suction cups 95 become worn or should a different size cup be required. The suction cups 95 are of the conventional type and are preferably made of a flexible elastomeric material, such as a flexible silicone elastomer material. The suction cups 95 can have various shapes and sizes depending on the size of the molded workpiece 31 to be handled. The spacing between the suction cups 95 is also adjustable and is matched to the spacing of the mold cavities 25 in the mold assembly 15. The suction cups 95 and couplings 97 may also be mounted on hollow, vertical extension members (not shown). The extension members will extend from the arm 85 to the couplings 97 and their size is determined by the size of the molded workpiece 31 being removed from the mold assembly 15.

Each suction cup 95 is connected by flexible tubing or a hose (not shown) to a vacuum pump, a vacuum generator or a venturi system (not shown), preferably PIAB of Hingham, Massachusetts. The flexible tubing is routed through the hollow arm 85. This keeps the tubing from obstructing the movement of the arm 85 as the arm 85 slides up and down the vertical rodless cylinder 81. The vertical rodless cylinder 81 is completed by magnetic limit switches 99a and 99b that stop the movement of the piston 87 in the respective upward and downward directions, and a shock absorber 101 that cushions the desent as the piston 87 moves downward along the cylinder 81.

As shown in FIGS. 4 to 8, the mounting plate 91 is positioned and leveled so that the vertical rodless cylinder 81 and the arm 85 with the suction cups 95 are aligned with the suctions cups 95 positioned beneath the center line or longitudinal axis a—a of the workpiece 25. Arm 85 must be of a sufficient length that the vertical rodless cylinder 81 is clear of the mold platens 29a and 29b as the mold assembly 15 cycles through the open and the closed position.

The horizontal rodless cylinder 83 is mounted on a support beam 103 mounted on the mounting plate 91. The horizontal rodless cylinder 83 provides for an upwardly turned U-shaped bracket 105 mounted on a piston 107 that travels along the rodless cylinder 83, a downwardly turned U-shaped bracket 109, pivotally mounted on the bracket 105 by a pivot pin 109a, and a manifold 111 servicing a number of extensions 111a that each extend to a quick disconnect coupling 113 and a suction cup 115. The pivotable bracket 109 is capable of being tilted through a range of angles above and below the horizontal plane shown. The range of tilt is between about −30° and +30° above and below the horizontal plane shown so that the suction cups 115 are able to engage molded workpieces 31 of a variety of sizes for moving the workpieces 31 to an endless conveyor 117. The manifold 111, extensions 111a and cups 115 can also be pivoted horizontally at an angle between about −30° and +30°. The pivotable bracket 109 is provided with locking screws (not shown) for locking the bracket 109 in a desired position. The horizontal rodless cylinder 83 is also connected to a pressurized air supply (not shown) for actuating the piston 107.

In a similar manner as the vertical rodless cylinder 81, the suction cups 115 of the horizontal rodless cylinder 83 are of the conventional type and are rigidly connected to the pivotable hollow arm 109 by the quick disconnect couplings 113. The coupling 113 enable the suction cups 115 to be easily removed and changed should the suction cups 115 become damaged, or should a different size suction cup 115 be required. The size of the suction cups 115 is directly related to the size and shape of the mold workpiece 31 that is being handled by the suction cups 115. The horizontal rodless cylinder 83 is also serviced by two magnetic limit switches 119a and 119b that govern the extent of the forward and backward travel of the piston 107 along the horizontal cylinder 83.

The part removal assembly 17 is completed by a chute 121 and the waste conveyor 79 as shown in phantom in FIGS. 4 to 8. The chute 121 is mounted on the upper portion of the support beam 103 and extends across an area underneath the space between the open mold platens 29a and 29b to the waste conveyor 79. The chute 121 channels all deformed workpieces 31 that the suction cups 95 and 115 of the part removal assembly 17 are unable to hold in a vacuum engagement, to the waste conveyor 79. The waste conveyor 79 also collects the waste flash portions 55 for recycling

IN OPERATION

As shown in schematic sequence in FIGS. 13 to 17, the blow molding machine 10 of the present invention is a shuttle type machine that provides for a right and a left mold assemblies 215a and 215b. For clarity in describing the invention, the front mold platen for both mold assemblies 215a and 215b is not shown. Only the back platens 229a and 229b with their respective mold sections 227a and 227b, corresponding to the mold assemblies 215a and 215b are shown. During the molding process, the molds assemblies 215a and 215b cycle between their respective blow cylinders 243a and 243b (depicting respective blow station assemblies) and a centrally located extruder head assembly 211.

As shown in FIG. 13, the molding process begins with the right mold assembly 215a receiving a parison 223 at the extruder head assembly 211 and the left mold assembly 215b at the left blow cylinder 243b. The left mold assembly 215b has already received a parison 223 at the extruder head assembly 211. Once the left mold assembly 215b reaches the left blow cylinder 243b, the left blow cylinder 243b is lowered to the left mold assembly 215b and a blow needle 247b is inserted into the top of the mold cavity 225b. Compressed air is then injected into the parison 223 causing the parison 223 to conform to the confines of the cavity 225b, to form a blow molded workpiece 231 (FIG. 14).

As shown in FIG. 14, as the workpiece 231 is being formed in the left mold assembly 215b, the right mold assembly 215a has closed on a parison 223 and moved to the right blow cylinder 243a. At about that time, the left mold assembly 215b is opened. This causes a waste flash portion 255b to be removed from the workpiece 231 by a flash removal device (not shown), similar to that described above. Immediately after the flash 255b is removed, a suction cup 295 engages a bottom portion 231a of the workpiece 231 and removes the workpiece 231 from the left mold assembly 215b in an operation that will be hereinafter described. The suction cup 295 travels on a vertically oriented rodless cylinder (not shown) in a similar manner as described above. Once a vacuum seal has been formed between the suction cup 295 and the bottom 231a of the workpiece 231, the blow cylinder 243b and blow needle 247b retract into the left blow station assembly (not shown). This causes the workpiece 231 to separate from the blow needle 247b and allows for unobstructed movement of the left mold assembly 215b back to the extruder head assembly 211.

In the event that the molded workpiece 231 has not been properly formed, but instead has formed a "glob"

or if the waste flash portion 255b has not fallen from the workpiece 231, the suction cup 295 will not be able to engage the workpiece 231. Instead, the "glob" falls off of the blow needle 247b and into a waste conveyor (not shown) when the blow needle 247b retracts into the left blow station assembly (not shown).

While the workpiece 231 is being removed from the left mold assembly 215b as shown in FIG. 15, a right blow cylinder 243a is lowered from the right blow station assembly (not shown) and a right blow needle 247a is inserted into the right mold assembly 215a. Compressed air is then injected into the mold cavity 225a, causing the parison 223 to conform to the confines of the cavity 225a to form a blow molded workpiece 231.

The extruder head assembly 211 is a continuous extruder that continuously produces a molten tube of plastic material in the form of a parison 223. At about the same time that a parison 223 of sufficient length has been extruded from the extruder head assembly 211, the molded workpiece 231 has been removed from the left mold assembly 215b and the left mold assembly 215b has moved back to the extruder head assembly 211 to capture a fresh parison 223 as shown in FIG. 16. After the left mold assembly 215b captures a fresh extrusion of parison 223, the left mold assembly 215b cycles back to the left blow cylinder 243b to form another workpiece (FIG. 17).

As the left mold assembly 215b is cycling back towards the left blow cylinder 243b, a molded workpiece 231 has finished being formed in the right mold assembly 215a (FIG. 16). The right mold assembly 215a then opens, causing a waste flash portion 255a to be canted off of the bottom of the workpiece 213 by a flash removal device (not shown), similar to that described above (FIG. 17). Immediately after the flash portion 255a is knocked off of the workpiece 231, the workpiece 231 is removed from the right mold assembly 215a as will hereinafter be more fully described. The right blow cylinder 243a and blow needle 247a then retract from the workpiece 231, into the right blow station assembly (not shown) to allow for unobstructed movement of the right mold assembly 215a back towards the extrusion head station 211 to complete one molding cycle.

The operation of the part removal assembly 17 is shown in detailed sequence in FIGS. 1 to 8. In these Figures the blow molding machine 10 is shown in a partial perspective view with only a left blow station assembly 13 with the extruder head assembly 11 shown. However, it should be understood, that it is preferred to have two blow station assemblies cycling in coordination with a centrally located extruder head assembly 11, as shown in schematic in FIGS. 13 to 17. Also, the mold assembly 15 with mold section 27b in FIGS. 1 to 3, provides for two mold cavities 25 that capture two parisons 23 extruded from the extruder head assembly 11. It should also be understood that the mold assemblies 15 can provide for one to four mold cavities 25. The extruder head assembly 11 and the blow station assembly 13 will provide for a sufficient amount of parisons 23 and blow needles 47, respectively, depending on the number of mold cavities 25 in the mold assembly 15.

As shown in FIGS. 1 and 2, before a molding cycle starts, the vertically traveling piston 87 with arm 85 and suction cups 95 is manually moved to a position just below the position the mold assembly 15 will occupy when the mold assembly 15 is at the blow station assembly 13. A compressed air supply (not shown) is then connected to the vertical rodless cylinder 81 so that the piston 87 will pneumatically travel up and down the rodless cylinder 81.

After the mold assembly 15 has captured two extrusions of parison 23, one in each of the mold cavities 25, the mold assembly 15 cycles over to the blow station assembly 13 (FIG. 2). The blow mold cylinders 43 are lowered in the blow station assembly 13 and the blow needles 47 are inserted into the top of the mold cavities 25 to cause each of the parisons 23 to form a blow molded workpiece 31. Once the workpiece 31 has been formed, the mold platens 29a and 29b move apart, causing the mold sections 27a and 27b to separate from the molded workpieces 31. This enables the flash removal assembly 57 to remove the waste flash portions 55 from each of the molded workpieces 31 as was previously described.

As shown in FIG. 3, as soon as the waste flash portion 55 is removed, the vertically traveling piston 87 moves up the rodless cylinder 81 to enable the suction cups 95 to engage the bottom portion 31a of the molded workpieces 31. The extent of the upward travel of the piston 87 is marked by the magnetic limit switch 99a. When the arm 85 contacts the magnetic limit switch 99a, the pneumatic pressure is removed from the piston 87, causing the piston 87 to discontinue movement in the upward direction. The magnetic limit switch 99a is self-sliding in a track running along the rodless cylinder 81 and can be locked in place depending on the size of the molded workpiece 31.

After the suction cups 95 engage the workpieces 31, the blow cylinders 43 retract upward, into the blow station assembly 13, causing the blow needles 47 to release from the neck 31b of the workpieces 31. The workpieces 31 are then supported only by the suction cups 95. The piston 87 then reverses its course and moves in a downward path along the rodless cylinder 81.

As shown in FIGS. 3 to 8, the suction cups 95 engage the molded workpiece 31 on the centerline or longitudinal axis a—a of the workpieces 31. However, as shown in FIG. 12, when a mold assembly 315 provides for a mold section 327 mounted on a mold platen 329 and having three mold cavities 325a, 325b and 325c for forming workpieces 331a, 331b and 331c, respectively, the left most workpiece 331a adjacent to a left guide pin 333a, is engaged by the suction cup 95 offset from the axis b—b of the workpiece 331a. This is necessitated because the arm 85 has a tendency to contact the guide pin 333a if the workpiece 331a is engaged on the longitudinal axis b—b of the workpiece 331a. In any event, even when the left most workpiece 331a is engaged offset from the axis b—b, the workpiece 331a itself has a tendency to contact the guide pin 333a as the workpiece 331a is being removed from the mold assembly 215. As shown in phantom in FIG. 12, the suction cups 95 hold the workpieces 331a, 331b and 331c firmly enough that the workpieces 331a, 331b and 331c are lowered from the mold assembly 215 with the longitudinal axis b—b of each of the workpieces 331a, 331b and 331c parallel to each other. A right guide pin 333b adjacent to the right most workpiece 331c is also shown; however, the workpiece 331c does not contact the guide pin 333b.

FIG. 4 shows the suction cup 95 in perspective as it engages the bottom 31a of the workpiece 31 after the blow needles 47 has retracted upward from the neck 31b of the workpiece 31. The vertically moveable piston 87 then moves downward along the rodless cylinder 81, lowering the workpiece 31 away from the mold assembly 15 until the bottom 31a of the workpiece 31 is adjacent to the endless conveyor 117 (FIG. 5). This lowered position is marked by the magnetic limit switch 99b.

The horizontally moveable piston 107 travels back and forth along the horizontal rodless cylinder 83. When the workpiece 31 has been moved to the lowered position adjacent to the conveyor 117, the horizontally moveable piston 107 is initially in the backwards position (FIG. 5). The piston 107 then moves forward to enable suction cup 115 to engage a side portion 31c of the workpiece 31 (FIG. 6). The extent of forward movement is governed by magnetic limit switch 119a. The vertically moveable piston 87 then moves downward an amount sufficient to disengage the suction cup 95 from the bottom 31a of the workpiece 31 (FIG. 7). The part removal cycle is completed when the horizontally moveable piston 107 moves backwards so that the bottom 31a of the workpiece 31 is in contact with the conveyor 117 (FIG. 8). The extent of backwards movement is governed by magnetic limit switch 119b. The vacuum is removed from the suction cup 115 and the workpiece 31 is placed on the conveyor 117 which moves the workpiece 31 to a collection means (not shown). The vertically moveable piston 87 then travels upward to its starting position directly below the mold assembly 15 (FIG. 1) to complete the part removal cycle.

A sliding backstop or gate (not shown) may also be provided adjacent to the conveyor 117. The backstop will help prevent the workpiece 31 from falling off of the conveyor 117 after the suction cup 115 has disengaged from the workpiece 31. The backstop is raised and lowered in synchronization with the back and forth movement of the piston 117.

During the time when the workpiece 31 is moved from the mold assembly 15 to the conveyor 117 by the part removal assembly 17, the mold assembly 15 has moved back to the extruder head assembly 11 to capture another parison 23 in each of its mold cavities 25. While the mold assembly 15 is at the extruder head assembly 11, the waste trough 37 mounted on the mold assembly 15 catches any scrap mold material that may fall off of the blow needles 47. Without the waste trough 37, this waste material could fall onto the suction cups 95 or the workpieces 31 as the workpieces 31 are being lowered from the mold assembly 15 by the suction cups 95. This will cause damage and fowling to both the workpieces 31 and the suction cups 95.

It should be understood that more than one suction cup 95 and 115 can be used to engage each workpiece 31 on the respective bottom portion 31a and the side portion 31c of the workpiece 31.

It is intended that the foregoing descriptions be only illustrative of the present invention and that the present inventions be limited only by the hereinafter appended claims.

I claim:

1. An apparatus for transferring a blow molded object from a molding means to a collection means after a plastic parison has been captured and molded between mold sections of the molding means which mold sections are relatively moveable between an open and a closed position, wherein in the closed position, the mold sections define a cavity that encloses the parison and the parison is then blown to conform to the cavity to form the molded object and after the molded object has been formed, the mold section move into the open position with a waste flash portion falling away from a lowermost portion of the blow molded object and with the blow molded object supported by a blowpin for blowing the parison to conform to the cavity, which comprises:

(a) a first upwardly moveable suction means having a first vacuum means that engages the blow molded object at the lowermost portion of the object, wherein the blow molded object is then removed from the blowpin as the first upwardly moveable suction means moves away from the mold sections of the molding means to a station adjacent to the collection means; and (b) a second moveable suction means which engages and moves the object to the collection means upon disconnection of the first suction means and then the second vacuum means is disconnected from the second moveable suction means to cause the blow molded object to disengage from the second moveable suction means and move to the collection means.

2. The apparatus of claim 1 wherein the first moveable suction means moves in a vertical path between a raised position where the first vacuum means of the first moveable suction means engages the blow molded object and a lowered position where the blow molded object is disengaged from the first vacuum means of the first moveable suction means.

3. The apparatus of claim 2 wherein when the second moveable suction means is disengaged the blow molded object moves from the second vacuum means to an endless conveyor means as the collection means.

4. The apparatus of claim 2 wherein the blow molded object has a bottom at the lowermost portion with at least one sidewall extending from the bottom to form the blow molded object and wherein the waste flash portion falls away from the bottom of the blow molded object to form a relatively smooth bottom surface for the blow molded object which the first vacuum means of the first moveable suction means engages as the mold sections of the molding means are moving into the open position.

5. The apparatus of claim 1 wherein the first and second vacuum means are vacuum cup means which are supplied with a vacuum from a vacuum pump means which creates the vacuum and wherein the first and second vacuum cup means are made from a flexible material which has a bellows shape comprised of a pleated expansible portion that extends to an end of the bellows for engaging the blow molded object.

6. The apparatus of claim 5 wherein the first and second vacuum cup means are made of an elastomeric material.

7. The apparatus of claim 5 wherein the first and second vacuum cup means are coupled to the vacuum pump means by a coupling means that enables the first and second vacuum cup means to be easily uncoupled from the vacuum pump means for changing the first and second vacuum cup means.

8. The apparatus of claim 1 wherein the collection means is an endless conveyor means that transports the blow molded object away from the molding means after the second vacuum means is disconnected from the second moveable suction means to cause the blow molded object to disengage from the second moveable suction means and move to the collection means.

9. The apparatus of claim 1 wherein there is a plurality of molding means forming a battery and wherein there is a respective battery of apparatuses for transferring a blow molded object from each of the molding means to the collection means.

10. The apparatus of claim 1 wherein the molding means is a shuttle type molding means comprised of an extruder head means for forming the plastic parison and a blowing means spaced from the extruder head means, wherein the mold sections shuttle between the extruder head means and the blowing means and wherein at the extruder head means at least one parison is captured in the cavity formed by the mold sections and at the blowing means, the blowpin engages the mold sections to blow the parison to conform to the cavity and wherein the mold sections then separate to expose the blow molded object which is engaged by the moveable suction means to remove the molded object from the blowpin and move the blow molded object to the collection means, and wherein after the blow molded object has been engaged by the first moveable suction means, the mold sections shuttle back to the extruder head means to capture another parison in the cavity in the mold means.

11. The apparatus of claim 10 wherein there are two spaced apart blowing means with corresponding mold sections for each of the blowing means and with an intermediate extruder head means, wherein the mold sections are synchronized to shuttle between their respective blowing means and the extruder head means with a first moveable suction means mounted adjacent to each of the blow means for engaging the blow molded object and moving the blow molded object from the mold sections to the collection means.

12. An apparatus for transferring a blow molded object from a molding means to a collection means after a plastic parison has been captured and molded between mold sections of the molding means which mold sections are relatively moveable between an open and a closed position, wherein in the closed position, the mold sections define a cavity that encloses the parison and the parison is then blown to conform to the cavity to form the molded object and after the molded object has been formed, the mold sections move into the open position with a waste flash portion falling away from a lowermost portion of the blow molded object and with the blow molded object supported by a blowpin for blowing the parison to conform to the cavity, which comprises:

(a) a first upwardly moveable suction means having a first vacuum means that engages the blow molded object at a lowermost portion of the object and removes the blow molded object from the blowpin to transfer the blow molded object to a first station adjacent to the collection means; and (b) a second sidewardly moveable suction means having a second vacuum means that engages the blow molded object after the first moveable suction means has moved the blow molded object to the first station and wherein after the second vacuum means engages the blow molded object, the first vacuum means releases to enable the second moveable suction means to transfer the blow molded object to a second station on the collection means.

13. The apparatus of claim 12 wherein the first and second vacuum means are vacuum cup means supplied with a vacuum from a vacuum source.

14. The apparatus of claim 13 wherein the vacuum cup means are flexible and are made of an elastomeric material.

15. The apparatus of claim 12 wherein the blow molded object has a bottom at the lowermost portion with at least one sidewall extending from the bottom to form the blow molded object and wherein the waste flash portion falls away from the bottom of the blow molded object to form a relatively smooth bottom surface for the blow molded object which the first vacuum means of the first moveable suction means engages as the mold sections of the molding means are moving into the open position.

16. The apparatus of claim 15 wherein the second vacuum means of the second moveable suction means engages the blow molded object on a portion of the sidewall of the molded object to move the blow molded object from the first station to the second station adjacent to the collection means.

17. The apparatus of claim 12 wherein the first moveable suction means moves in a vertical path between where the first vacuum means engages the blow molded object as the mold sections of the molding means are moving into the open position and the first station adjacent to the collection means and wherein the second moveable suction means moves sidewardly in a horizontal path between the first station and where the second suction means transfers the blow molded object at the second station on the collection means.

18. The apparatus of claim 12 wherein the molding means is a shuttle type molding means comprised of an extruder head means for forming the plastic parison and a blowing means spaced from the extruder head means, wherein the mold sections shuttle between the extruder head means and the blowing means and wherein at the extruder head means at least one parison is captured in the cavity formed by the mold sections and at the blowing means, the blowpin engages the mold sections to blow the parison to conform to the cavity and wherein the mold sections then separate to expose the blow molded object which is engaged by the moveable suction means to remove the molded object from the blowpin and move the blow molded object to the collections means, and wherein after the blow molded object has been engaged by the moveable suction means, the mold sections shuttle back to the extruder head means to capture another parison in the cavity in the mold means.

19. The apparatus of claim 18 wherein there are two to four spaced apart blowing means with corresponding mold sections for each of the blowing means and with an intermediate extruder head means, wherein the mold sections are synchronized to shuttle between their respective blowing means and the extruder head means with a moveable suction means mounted adjacent to each of the blow means for engaging the blow molded object and moving the blow molded object from the mold sections to the collections means.

20. An apparatus for transferring a blow molded container from a molding means for forming the container to a collection means after a plastic parison has been captured and molded between mold sections of the molding means which mold sections are relatively moveable between an open and a closed position, wherein in the closed position, the mold sections define a cavity that encloses the parison and the parison is blown to conform to the cavity by a blowpin in communication with the cavity and after the molded container has been formed, the mold sections move into the open position with a waste flash portion falling away from a lowermost portion of the blow molded object and with the blow molded container supported by the blowpin, which comprises:

(a) a first transferring means vertically moveable between a first and a second station, the first transferring means mounting a first vacuum means for engaging the molded container, wherein the first transferring means moves to the first station to enable the first vacuum means to engage the molded container at the lowermost position as the mold sections are moved into the open position and wherein the first transferring means then removes the molded container from the blowpin and moves to the second station with the first vacuum means holding the molded container; and (b) a second transferring means, horizontally moveable between the second and a third stations, the second transferring means mounting a second vacuum means for engaging the molded container, wherein the second transferring means moves to the second station to enable the second vacuum means to engage the molded container once the first transferring means has moved the molded container to the second station with the second vacuum means engaging the molded container before the first vacuum means has released from the container, to move the molded container to the third station wherein the second vacuum means releases the molded container onto the collection means.

21. The apparatus of claim 20 wherein the first transferring means includes a first arm slideably mounted on a first track and having at least one suction cup means in communication with a vacuum source as the first vacuum means, wherein the first arm moves in a vertical path along the first track between a raised position at the first station, to allow the first vacuum means to engage the molded container supported by the blowpin and a lowered position at the second station to lower the molded container away from the mold sections to a position adjacent to the collection means and wherein the second transferring means includes a second arm slideably mounted on a second track and having at least one suction cup means in communication with a vacuum source as the second vacuum means, wherein the second arm moves sidewardly in a horizontal path along the second track between the second station, with the first arm continuing to engage the molded container until the second arm engages the molded container, and the third station where the second arm places the molded container onto the collection means.

22. The apparatus of claim 20 wherein the first track includes a first and a second shock absorber means adjacent to the respective first and second stations for cushioning the movement of the first arm along the first track as the first arm moves between the first and the second stations.

23. The apparatus of claim 20 wherein the apparatus is portable for moving the apparatus between a first and a second molding devices.

24. The apparatus of claim 21 wherein the movement of the first and the second arms on the respective first and second tracks is limited by adjustable limit switch means that cause the arms to discontinue movement along the respective tracks.

25. The apparatus of claim 20 wherein the collection means is an endless conveyor means that transports the molded container away from the molding means.

26. The apparatus of claim 20 wherein the molded container has a bottom at the lowermost portion with at least one sidewall extending from the bottom to form the molded container and wherein the waste flash portion falls away from the bottom of the blow molded object to form a relatively smooth bottom surface for the molded container which the first vacuum means of the first transferring means engages as the mold sections of the molding means are moving into the open position and wherein the second vacuum means of the second transferring means engages the molded container on a portion of the sidewall of the molded container to move the molded container from the second station to the third station where the second vacuum means releases the molded container onto the collection means.

27. The apparatus of claim 20 wherein the molding means is a shuttle type molding means comprised of an extruder head means for forming the plastic parison and a blowing means spaced from the extruder head means, wherein the mold sections shuttle between the extruder head means and the blowing means and wherein at the extruder head means at least one parison is captured in the cavity formed by the mold sections and at the blowing means, the blowpin engages the mold sections to blow the parison to conform to the cavity and wherein the mold sections then separate to expose the blow molded object which is engaged by the moveable suctions means to remove the molded object from the blowpin and move the blow molded object to the collection means, and wherein after the blow molded object has been engaged by the moveable suction means, the mold sections shuttle back to the extruder head means to capture another parison in the cavity in the mold means.

28. The apparatus of claim 27 wherein there are two to four spaced apart blowing means with corresponding mold sections for each of the blowing means and with an intermediate extruder head means, wherein the mold sections are synchronized to shuttle between their respective blowing means and the extruder head means with a moveable suction means mounted adjacent to each of the blow means for engaging the blow molded object and moving the blow molded object from the mold sections to the collection means.

29. A method for transferring a blow molded object from a molding means to a collection means after a plastic parison has been captured and molded between mold sections of the molding means which mold sections are relatively moveable between an open and a closed position, wherein in the closed position, the mold sections define a cavity that encloses the parison and the parison is then blown to conform to the cavity to form the blow molded object and after the molded object has been formed, the mold sections move into the open position with a waste flash portion falling away from a lowermost portion of the blow molded object and with the blow molded object supported by a blowpin for blowing the parison to conform to the cavity, which comprises:

(a) introducing a plastic parison into the cavity formed by the mold sections of the molding means and blowing the plastic parison to the confines of the cavity with the blowpin to form the blow molded object; and (b) transferring the blow molded object by a first moveable suction means having a first vacuum means which engages the blow molded object at the lowermost portion of the object, wherein the blow molded object is then removed from the blowpin as the first moveable suction means moves away from the mold sections of the molding means; and by a second moveable suction means which engages and moves the object to the collection means upon disconnection of the first suction means and then the second vacuum means is disconnected from the second moveable suction means to cause the blow molded object to disengage from the second moveable suction means and move to the collection means.

30. The method of claim 29 wherein the first moveable suction means moves in a vertical path between a raised position where the first vacuum means of the first moveable suction means engages the blow molded object and a lowered position where the blow molded object is disengaged from the first vacuum means of the first moveable suction means.

31. The method of claim 30 wherein when the second moveable suction means is disengaged the molded object moves from the second vacuum means to an endless conveyor means as the collection means.

32. The method of claim 30 wherein the blow molded object has a bottom at the lowermost portion with at least one sidewall extending from the bottom to form the blow molded object and wherein the waste flash portion falls away from the bottom of the blow molded object to form a relatively smooth bottom surface for the blow molded object which the first vacuum means of the first moveable suction means engages as the mold sections of the molding means are moving into the open position.

33. The method of claim 29 wherein the first and second vacuum means are vacuum cup means which are supplied with a vacuum from a vacuum pump means which creates a vacuum and wherein the first and second vacuum cup means are made from a flexible material which has a bellows shape comprised of a pleated expansible portion that extends to an end of the bellows for engaging the blow molded object.

34. The method of claim 33 wherein the first and second vacuum cup means are made of an elastomeric material.

35. The method of claim 33 wherein the first and second vacuum cup means are coupled to the vacuum pump means by a coupling means that enables the first and second vacuum cup means to be easily uncoupled from the vacuum pump means for changing the first and second vacuum cup means.

36. The method of claim 29 wherein the collection means is an endless conveyor means that transports the molded object away from the molding means after the second vacuum means is disconnected from the second moveable suction means to cause the molded object to disengage from the second moveable suction means and move to the collection means.

37. The method of claim 29 wherein there is a plurality of molding means forming a battery and wherein there is a respective battery of apparatus for transferring a blow molded object from each of the molding means to the collection means.

38. The method of claim 29 wherein the molding means is a shuttle type molding means comprised of an extruder head means for forming the plastic parison and a blowing means spaced from the extruder head means, wherein the mold sections shuttle between the extruder head means and the blowing means and wherein at the extruder head means at least one parison is captured in the cavity formed by the mold sections and at the blowing means, the blowpin engages the mold sections to blow the parison to conform to the cavity and wherein the mold sections then separate to expose the blow molded object which is engaged by the moveable suction means to remove the molded object from the blowpin and move the blow molded object to the collection means, and wherein after the blow molded object has been engaged by the first moveable suction means, the mold sections shuttle back to the extruder head means to capture another parison in the cavity in the mold means.

39. The method of claim 38 wherein there are two to four spaced apart blowing means with corresponding mold sections for each of the blowing means and with an intermediate extruder head means, wherein the mold sections are synchronized to shuttle between their respective blowing means and the extruder head means with a first moveable suction means mounted adjacent to each of the blow means for engaging the blow molded object and moving the blow molded object from the mold sections to the collection means.

40. A method for transferring a blow molded object from a molding means to a collection means after a plastic parison has been captured and molded between mold sections of the molding means which mold sections are relatively moveable between an open and a closed position, wherein in the closed position, the mold sections define a cavity that encloses the parison and the parison is then blown to conform to the cavity to form the molded object and after the molded object has been formed, the mold sections move into the open position with a waste flash portion falling away from a lowermost portion of the blow molded object and with the blow molded object supported by a blowpin for blowing the parison to conform to the cavity, which comprises:

(a) introducing a plastic parison into the cavity formed by the mold sections of the molding means and blowing the plastic parison to the confines of the cavity with the blowpin to form the molded object; and (b) transferring the blow molded object to the collection means by a first moveable suction means which engages the blow molded object at the lowermost portion of the object and removes the blow molded object from the blowpin and by a second moveable suction means which engages the blow molded object after the first moveable suction means has moved the blow molded object to the first station so that the second suction means transfers the blow molded object to the second station on the collection means.

41. The method of claim 40 wherein the first and second vacuum means are flexible vacuum cup means, made of an elastomeric material.

42. The method of claim 40 wherein the molded object has a bottom at the lowermost portion with at least one sidewall extending from the bottom to form the molded object and wherein the waste flash portion falls away from the bottom of the blow molded object to form a relatively smooth bottom surface for the blow molded object which the first vacuum means of the first moveable suction means engages as the mold sections of the molding means are moving into the open position.

43. The method of claim 42 wherein the second vacuum means of the second moveable suction means engages the blow molded object on a portion of the sidewall of the blow molded object to move the blow molded object from the first station to the second station adjacent to the collection means.

44. The method of claim 40 wherein the first moveable suction means moves in a vertical path between where the first vacuum means engages the blow molded object as the mold sections of the molding means are moving into the open position and the first station adjacent to the collection means and wherein the second moveable suction means moves sidewardly in a horizontal path between the first station and where the second suction means transfers the blow molded object to the second station on the collection means.

45. The method of claim 40 wherein the molding means is a shuttle type molding means comprised of an extruder head means for forming the plastic parison and a blowing means spaced from the extruder head means, wherein the mold sections shuttle between the extruder head means and the blowing means and wherein at the extruder head means at least one parison is captured in the cavity formed by the mold sections and at the blowing means, the blowpin engages the mold sections to blow the parison to conform to the cavity and wherein the mold sections then separate to expose the blow molded object which is engaged by the moveable suction means to remove the molded object from the blowpin and move the blow molded object to the collection means, and wherein after the blow molded object has been engaged by the moveable suction means, the mold sections shuttle back to the extruder head means to capture another parison in the cavity in the mold means.

46. The method of claim 45 wherein there are two to four spaced apart blowing means with corresponding mold sections for each of the blowing means and with an intermediate extruder head means, wherein the mold sections are synchronized to shuttle between their respective blowing means and the extruder head means with a moveable suction means mounted adjacent to each of the blow means for engaging the blow molded object and moving the blow molded object from the mold sections to the collection means.

47. A method for transferring a blow molded container from a molding means for the container to a collection means after a plastic parison has been captured and molded between mold sections of the molding means which mold sections are relatively moveable between an open and a closed position, wherein in the closed position, the mold sections define a cavity that encloses the parison and the parison is blown to conform to the cavity by a blow pin in communication with the cavity and after the molded container has been formed, the mold sections move into the open position with a waste flash portion falling away from a lowermost portion of the blow molded object and with the molded container supported by the blowpin, which comprises:
(a) introducing a plastic parison into the cavity formed by the molded sections of the molding means and blowing the plastic parison to the confines of the cavity with the blowpin to form the molded container; and
(b) transferring the molded container to the collection means by a first transforming means having a first vacuum means and a second transferring means having a second vacuum means, which first transferring means moves to the first station to enable the first vacuum means to engage the molded container at the lowermost portion of the container as the mold sections are moved into the open positions, and wherein the first transferring means then moves the molded container from the blowpin to the second station with the first vacuum means holding the molded container, and wherein the second transferring means, which moves between the second and the third stations, moves to the second station with the second vacuum means engaging the molded container once the first transferring means has moved the molded container to the second station, but before the first vacuum means has released from the molded container, to move the molded container to the third station wherein the second vacuum means releases the molded container onto the collection means.

48. The method of claim 47 wherein the first transferring means includes a first arm slideably mounted on a first track and having at least one suction cup means in communication with a vacuum source as the first vacuum means, wherein the first arm moves along the first track in a vertical path between a raised position at the first station, to allow the first vacuum means to engage the molded container supported by the blow pin and a lowered position at the second station, to lower the molded container away from the mold sections to a position adjacent to the collection means, and wherein the second transferring means includes a second arm slideably mounted on a second track and having at least one suction cup means in communication with a vacuum source as the second vacuum means, wherein the second arm moves along the second track sidewardly in a horizontal path between the second station, with the first arm continuing to engage the molded container until the second arm engages the molded container, and the third station where the second arm places the molded container onto the collection means.

49. The method of claim 47 wherein the first track includes a first and a second shock absorber means adjacent to the respective first and second stations for cushioning the movement of the first arm along the first track as the first arm moves between the first and the second stations.

50. The method of claim 47 wherein the apparatus is portable for moving the apparatus between a first and a second molding devices.

51. The method of claim 48 wherein the movement of the first and the second arms on the respective first and second tracks is limited by adjustable limit switch means that cause the arms to discontinue movement along the respective tracks.

52. The method of claim 47 wherein the collection means is an endless conveyor means that transports the molded object away from the molding means.

53. The method of claim 47 wherein the molded container has a bottom at the lowermost portion with at least one sidewall extending from the bottom to form the molded container and wherein the waste flash portion falls away from the bottom of the molded container to form a relatively smooth bottom surface for the molded container which the first vacuum means of the first transferring means engages as the mold sections of the molding means are moving into the open positions and wherein the second vacuum means of the second transferring means engages the molded container on a portion of the sidewall of the molded container to move the molded container from the second station to the third station where the second vacuum means releases the molded container on the collection means.

54. The method of claim 47 wherein the molding means is a shuttle type molding means comprised of an extruder head means for forming the plastic parison and a blowing means spaced from the extruder head means, wherein the mold sections shuttle between the extruder head means and the blowing means and wherein at the extruder head means at least one parison is captured in the cavity formed by the mold sections and at the blowing means, the blowpin engages the mold sections to blow the parison to conform to the cavity and wherein the mold sections then separate to expose the blow molded object which is engaged by the moveable suction means to remove the molded object from the blowpin and move the blow molded object to the collection means, wherein after the blow molded object has been engaged by the moveable suction means, the mold sections shuttle back to the extruder head means to capture another parison in the cavity in the mold means.

55. The method of claim 54 wherein there are two to four spaced apart blowing means with corresponding mold sections for each of the blowing means and with an intermediate extruder head means, wherein the mold sections are synchronized to shuttle between their respective blowing means and the extruder head means with a moveable suction means mounted adjacent to each of the blow means for engaging the blow molded object and having the blow molded object from the mold sections to the collection means.

* * * * *

UNITED STATES PATENT AND TRADEMARK OFFICE
CERTIFICATE OF CORRECTION

PATENT NO. : 5,156,798
DATED : October 20, 1992
INVENTOR(S) : Karl H. Bruning

It is certified that error appears in the above—identified patent and that said Letters Patent is hereby corrected as shown below:

Column 5, line 63, --descriptions and to the drawings-- should be inserted after "following".

Column 14, line 17, after "recycling", --or disposal-- should be inserted.

Column 18, line 3 (Claim 1), "section" should be --sections--.

Column 20, line 46 (Claim 18), "collections" should be --collection--.

Column 22, line 33 (Claim 27), "the" before "moveable" should be deleted and --a-- inserted therefor.

Column 22, lines 33 and 34 (Claim 27), "suctions" should be --suction--.

Column 26, line 2 (Claim 47), "transforming" should be --transferring--.

Signed and Sealed this

Fifth Day of October, 1993

*Attest:*

BRUCE LEHMAN

*Attesting Officer*       Commissioner of Patents and Trademarks